United States Patent
Schwartz et al.

(10) Patent No.: US 6,473,609 B1
(45) Date of Patent: Oct. 29, 2002

(54) METHOD AND ARCHITECTURE FOR INTERACTIVE TWO-WAY COMMUNICATION DEVICES TO INTERACT WITH A NETWORK

(75) Inventors: Bruce V. Schwartz, San Mateo; Russell S. Greer, Los Gatos; Stephen S. Boyle, Fremont; Mark A. Fox, San Mateo; Alain S. Rossmann, Palo Alto; Mark G. Lentczner, Mountain View; Andrew L. Laursen, San Mateo; Brad E. Sandman, Sunnyvale, all of CA (US)

(73) Assignee: Openwave Systems Inc., Redwood City, CA (US)

(*) Notice: Subject to any disclaimer, the term of this patent is extended or adjusted under 35 U.S.C. 154(b) by 0 days.

(21) Appl. No.: 09/153,322

(22) Filed: Sep. 14, 1998

Related U.S. Application Data

(63) Continuation-in-part of application No. 08/570,210, filed on Dec. 11, 1995, now Pat. No. 5,809,415.

(51) Int. Cl.[7] .............................. H04Q 7/20; H04Q 7/34
(52) U.S. Cl. ...................... 455/406; 455/422; 455/426; 455/414; 455/550; 455/408; 455/403
(58) Field of Search ................................ 455/403, 422, 455/426, 414, 445, 411, 412, 550, 556, 466, 517, 406, 407, 408; 701/213

(56) References Cited

U.S. PATENT DOCUMENTS 4,787,028 A 11/1988 Finfrock et al.
4,812,843 A 3/1989 Champion, III et al.

(List continued on next page.)

FOREIGN PATENT DOCUMENTS

EP 0 646 856 A2 4/1995
EP 0691619 A2 1/1996

(List continued on next page.)

OTHER PUBLICATIONS

Meyer M et al: The On–The–Move Concept For Mobile Middleware Iss. World Telecommunications Congress. (International Switching Symposium), CA, Toronto, Pinnacle Group. 373–378, XP000704489.

(List continued on next page.)

*Primary Examiner*—William Trost
*Assistant Examiner*—Keith Ferguson
(74) *Attorney, Agent, or Firm*—Blakely, Sokoloff, Taylor & Zafman LLP

(57) ABSTRACT

The present invention is particularly applicable to navigation of Internet by two-way interactive communication mobile devices that are capable of wireless communication via a link server with service providers or network servers on the Internet. Despite the limited computing resources in mobile devices that make it economically and technically impractical for the mobile devices to operate a local browser functioning as if it was in a desktop computer, the present invention allows the mobile devices to interact effectively with the Internet using a control engine operating in the link server and an interface engine operating in the mobile devices. The control engine, which utilizes the computing resources of the link server device, is responsible for tasks that require considerable computing power and memory, such as processing of URL requests, interpretation of markup language files, management of data cache and variable states. Further, working with a message processor in the server device, the control engine communicates with an interface engine using a compact data format that is efficiently transportable in the wireless data network. The interface engine typically performs tasks that do not require considerable computing power and memory, such as receiving input data from users, and the rendering of the compact data format received from the link server device, to cause the mobile device to display contents in the markup language files on a display screen.

49 Claims, 19 Drawing Sheets

U.S. PATENT DOCUMENTS

| | | | |
|---|---|---|---|
| 5,008,925 A | 4/1991 | Pireh | |
| 5,128,672 A | 7/1992 | Kaehler | 341/23 |
| 5,335,276 A | 8/1994 | Thompson et al. | |
| 5,465,401 A | 11/1995 | Thompson | |
| 5,491,605 A | 2/1996 | Hughbanks et al. | |
| 5,491,745 A | 2/1996 | Roeder | |
| 5,548,636 A | 8/1996 | Bannister et al. | |
| 5,555,446 A | 9/1996 | Jasinski | |
| 5,560,008 A | 9/1996 | Johnson et al. | |
| 5,577,100 A | 11/1996 | McGregor et al. | |
| 5,577,103 A | 11/1996 | Foti | |
| 5,577,209 A | 11/1996 | Boyle et al. | |
| 5,579,535 A | 11/1996 | Orlen et al. | |
| 5,581,595 A | 12/1996 | Iwashita et al. | |
| 5,606,786 A | 3/1997 | Presby | |
| 5,608,786 A | 3/1997 | Gordon | |
| 5,623,605 A | 4/1997 | Keshav et al. | |
| 5,625,605 A | 4/1997 | Sullivan et al. | |
| 5,671,354 A | 9/1997 | Ito et al. | |
| 5,673,322 A | 9/1997 | Pepe et al. | |
| 5,675,507 A | 10/1997 | Bobo, II | |
| 5,708,828 A | 1/1998 | Coleman | |
| 5,727,159 A | 3/1998 | Kikinis | 455/426 |
| 5,740,252 A | 4/1998 | Minor et al. | |
| 5,742,668 A | 4/1998 | Pepe et al. | |
| 5,742,905 A * | 4/1998 | Pepe et al. | 455/422 |
| 5,745,706 A | 4/1998 | Wolfberg et al. | |
| 5,751,798 A | 5/1998 | Mumick et al. | |
| 5,809,415 A | 9/1998 | Rossmann | |
| 5,841,764 A * | 11/1998 | Roderique et al. | 455/426 |
| 5,852,717 A | 12/1998 | Bhide et al. | |
| 5,854,936 A | 12/1998 | Pickett | |
| 5,867,153 A | 2/1999 | Grandcolas et al. | |
| 5,884,284 A | 3/1999 | Peters et al. | |
| 5,909,485 A | 6/1999 | Martin et al. | |
| 5,918,013 A | 6/1999 | Mighdoll et al. | |
| 5,940,589 A | 8/1999 | Donovan et al. | |
| 5,943,399 A * | 8/1999 | Bannister et al. | 455/414 |
| 5,958,006 A | 9/1999 | Eggleston et al. | |
| 5,995,606 A | 11/1999 | Civanlar et al. | |
| 6,021,437 A | 2/2000 | Chen et al. | |
| 6,023,698 A | 2/2000 | Lavey, Jr. et al. | |
| 6,031,904 A | 2/2000 | An et al. | |
| 6,049,711 A | 4/2000 | Ben-Yehezkel et al. | |
| 6,049,821 A | 4/2000 | Theriault et al. | |
| 6,055,441 A | 4/2000 | Wieand et al. | |
| 6,085,105 A | 7/2000 | Becher | |
| 6,119,137 A | 9/2000 | Smith et al. | |
| 6,122,403 A | 9/2000 | Rhoads | |
| 6,131,067 A * | 10/2000 | Girerd et al. | 701/213 |
| 6,138,158 A | 10/2000 | Boyle et al. | |
| 6,157,823 A | 12/2000 | Fougnies et al. | |
| 6,167,253 A | 12/2000 | Farris et al. | |
| 6,185,184 B1 | 2/2001 | Mattaway et al. | |
| 6,195,693 B1 | 2/2001 | Berry et al. | |
| 6,233,608 B1 | 5/2001 | Laursen et al. | |
| 6,247,048 B1 | 6/2001 | Greer et al. | |

FOREIGN PATENT DOCUMENTS

| | | | |
|---|---|---|---|
| EP | 0 646 856 A3 | 12/1996 | |
| EP | 0691619 A3 | 6/1997 | |
| EP | 0812120 A2 | 12/1997 | |
| EP | 0893760 A2 | 1/1999 | |
| EP | 0812120 A3 | 5/1999 | |
| FI | 100137 | 9/1997 | G07F/19/00 |
| FI | 102020 | 9/1998 | G07F/19/00 |
| JP | 5-233191 | 9/1993 | |
| JP | 6-110637 | 4/1994 | |
| JP | 6-175764 | 6/1994 | |
| JP | 7-13671 | 1/1995 | |
| JP | 7-263187 | 10/1995 | |
| JP | 59-41047 | 3/1997 | |
| JP | 5-35421 | 2/1999 | |
| WO | WO 93/16550 | 8/1993 | H04M/11/00 |
| WO | WO 96/13814 | 5/1996 | G07F/7/08 |
| WO | WO-97-14244 | 4/1997 | |
| WO | 97 27546 | 7/1997 | |
| WO | WO 97/41654 | 11/1997 | |

OTHER PUBLICATIONS

C. Erlandson et al. "WAP–The Wireless Application Protocol" Ericsson Review No. 4, pp. 150–153, Stockholm, 1998, XP–00792053.

Patent application EP 95935472.1–2207.

Behruz Vazvan: "Real Time Tele–payment System" Distributed in an EU's organized international seminar "Race Mobile Summit," Cascais–Portugal, 22–24.11.1995.

M. Liljeberg et al.: "Optimizing World–Wide Web for Weakly Connected Mobile Workstations: An Indirect Approach" International Workshop on Sercvices in Distributed and Networked Environments, Jun. 5, 1995, pp. 132–139, XP000764774.

M. F. Kaashoek et al.: "Dynamic Documents: Mobile Wireless Access to the WWW" Proceedings, Workshop on Mobile Computing Systems and Applications, Dec. 8, 1994, pp. 179–184, XP0002016896.

S. Gessler et al.: "PDAs as mobile WWW browsers" Computer Networks and ISDN Systems, vol. 28, No. 1, Dec. 1, 1995, p. 53–59, XP004001210.

G. M. Voelker et al.: "Mobisaic: An Information System for a Mobile Wireless Computing Environment" Proceedings, Workshop on Mobile computing Systems and Applications, vol. 5, No. 10, Jan. 1, 1995, pp. 185–190, XP002062595.

Bekre et al.; Institute of Electrical and Electronics Engineers, Inc.; "Distributed Computing Systems"; May 30–Jun. 2, 1995; pp. 136–143; *IEEE Computer Society*.

Japanese Publication; "Netscape Navigator for Windows"; Chapters 1–3; Jul. 31, 1995.

Japanese Publication; "Nifty Serve"; p. 61; Oct. 5, 1992.

Japanese Article; "Mosaic"; *Unix Magazine;* pp. 36–44; Mar. 1994.

Japanese Publication; "Introduction to HTML–WWW Publishing"; pp. 9, 14, 15, 20, 32–34, 163, 269, 286, 287 and 270; Jun. 30, 1995.

Japanese Publication; Larry Aronson; "Introduction to HTML"; Jul. 1, 1995.

*Nikkei Multimedia Magazine;* pp. 109–111; Nov. 1995.

"Introduction to HTML (3)"; *Unix Magazine;* Dec. 1994; pp. 49–52.

"NCSA HTTP Defined and Introduction to HTML"; *Unix Magazine;* Oct. 1994; pp. 52–60.

*ASCII Magazine,* vol. 19, No. 7; Jul. 1995; pp. 331–353.

*Mac Power Magazine;* Jun. 1995; pp. 105 and 268.

"HDTP Specification, Version 1.1—Draft", Unwired Planet, Incorporated, Jul. 15, 1997, pp. 1–40.

"HDML 2.0 Language Reference, Version 2.0", Unwired Planet, Incorporated, Jul. 1997, pp. 1–56.

* cited by examiner

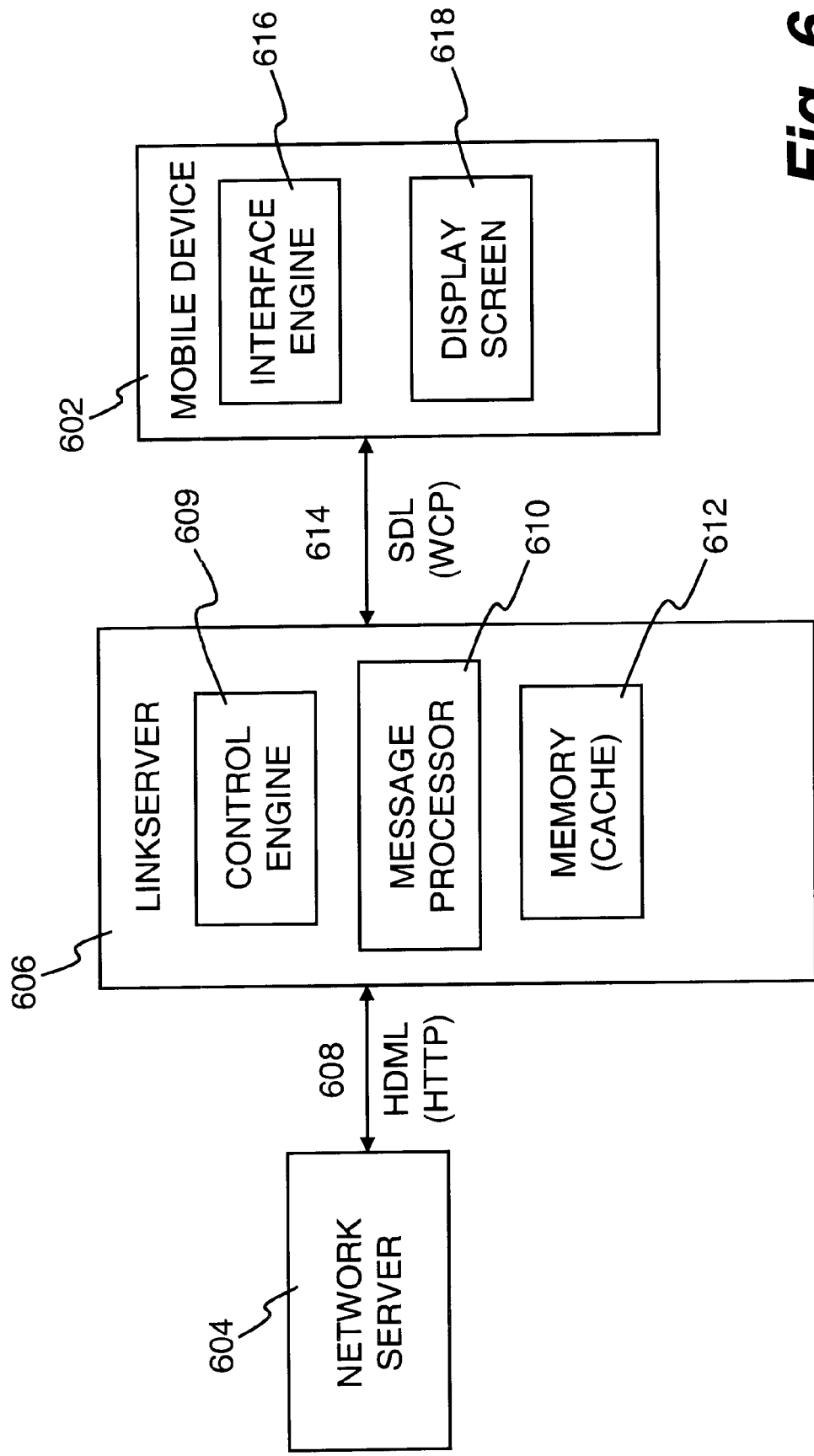

| User ID | address identifier | Address buffer |
|---|---|---|
| 0192834 | 1234 | http://www.xyzinfo.com/ABCCorp/sales |
| 0192834 | 1235 | http://www.xyzinfo.com/XYZInformation |
| 0192834 | 12ab | http://www.xyzinfo.com/FinancialInfo |
| ... | | |
| 0192eds | abcd | http://www.sjmercury.com/stockquotes |
| ... | | |
| 019wsfd | 1402bvs | http://www.uplanet.com/products |
| ... | | |

Fig. 8B

METHOD AND ARCHITECTURE FOR INTERACTIVE TWO-WAY COMMUNICATION DEVICES TO INTERACT WITH A NETWORK

CROSS-REFERENCE TO RELATED APPLICATION

This application is a continuation-in-part of U.S. patent application Ser. No. 08/570,210, now U.S. Pat. No. : 5,809,415, entitled "METHOD AND ARCHITECTURE FOR AN INTERACTIVE TWO-WAY DATA COMMUNICATION NETWORK" by Alain Rossmann, one of the co-inventors hereof.

AUTHORIZATION WITH RESPECT TO COPYRIGHTS

A portion of the present disclosure contains material subject to copyright protection. Such material includes, but is not limited to, an Appendix entitled "Imp Specification protocols between Femto Engine and Terminal". The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates generally to data communications, and in particular to interactive two-way communication mobile devices that permit a user to interact with a network server providing hypermedia information through a data network. Such a data network can include, for example, the Internet and a wireless network. The mobile devices may include cellular telephones, two-way pagers, or a palm-sized computing devices and typically have limited computing resources.

2. Description of the Related Art

The Internet is a rapidly growing communication network of interconnected computers and computer networks around the world. Together, these connected computers form a vast repository of multimedia information that is readily accessible by the connected computers from anywhere at any time. To navigate a portion of the Internet organized as the "World Wide Web", the connected computers, e.g., workstations and desktop computers, typically operate a user interface called a "browser". A browser is a client application program that generally requests multimedia information throughout the Internet using, typically, the Hypertext Transfer Protocol (HTTP). A computer which operates a browser using HTTP is generally a relatively powerful computer with sufficient computing resources, such as processing power, memory, a display capability and a user interface.

To provide mobility and portability of access to the Internet, interactive two-way communication mobile devices capable of communicating, via wireless data networks, with the Internet have been introduced. The interactive two-way communication mobile devices (e.g., two-way pagers, cellular phones, palm-sized computing devices and personal digital assistants (PDAs)) are among the fastest emerging communication devices. These devices enable users to receive, collect, analyze, review and disseminate information as the users travel or move about. Unlike computers coupled to the Internet, the mobile devices are characterized by severe limitations in computing resources. For example, a cellular phone has less than one percent processing power of a typical desktop personal computer, generally less than 128 kilobytes of memory, an LCD display which is perhaps four lines high by twelve or twenty characters, and limited or non-existent graphics capabilities. Further, a cellular phone inputs using a keypad that has far fewer keys than a typical personal computer (PC) keyboard. With these constraints, a mobile device cannot efficiently operate the browser used by desktop computers to navigate the Internet.

To make available to mobile devices computing resources comparable to a desktop computer is too costly. There is, therefore, a great need for a solution that enables mobile devices to freely access information on the Internet without providing these computing resources in the mobile devices.

Additionally, mobile devices are typically serviced through one or more wireless service carriers. The wireless service carriers often provide additional services by upgrading client application programs in the mobile devices. In conventional computers, an upgrade can be accomplished by downloading a new version of an application program from a service provider. In mobile devices, downloading a new version of an application program can be a prohibitive task, limited by the performances of the computing resources and the wireless network. Hence, there is a further need for an ability to manage client application programs operated by the mobile devices.

SUMMARY OF THE INVENTION

The present invention addresses the above described problems and is particularly applicable to navigation of Internet web pages by two-way interactive communication mobile devices (e.g., mobile computing devices, cellular phones, palm-sized computer devices, personal digital assistant devices and Internet-capable appliance remote controllers) which are capable of wireless communication via a link server with service providers or network servers on the Internet. Despite the common deficiencies of mobile devices (i.e., a primitive processor, little memory and limited graphics capability) which make it economically and technically impractical for the mobile devices to operate a local browser functioning as if it was in a desktop computer, the present invention allows the mobile devices to interact effectively with the Internet and can be used with a wide variety of wireless communication networks (e.g., cellular digital packet data (CDPD) network, Global System for Mobile Communications (GSM) network, Code Division Multiple Access (CDMA) network and Time Division Multiple Access (TDMA) network).

According to one aspect of the present invention, a mobile device includes an interface engine that, via a client module, communicates and operates with a control engine in a link server device over a wireless network. The control engine, which utilizes the computing resources of the link server device, is responsible for tasks that require considerable computing power and memory, such as processing of URL requests, interpretation of markup language files, management of data cache and variable states. Further, working with a message processor in the server device, the control engine communicates with an interface engine using a compact data format that is efficiently transportable in the wireless data network. The interface engine typically performs tasks that do not require considerable computing power and memory, such as receiving input data from users, and the rendering of the compact data format received from the link server device, to cause the mobile device to display contents in the markup language files on a display screen.

According to another aspect of the present invention, incoming messages to the mobile device, including notification and requests, and which typically has one or more universal resource identifiers or locators, are processed in the link server device to generate compact messages. The link server device replaces universal resource locators in the incoming message with address identifiers, and manages an address table mapping each universal resource locator with an address identifier. Thus processed, the resulting compact messages demand less bandwidth of the wireless network, thus reducing high latency and requiring less air time.

According to still another aspect of the present invention, local service requests in the mobile device are processed simultaneously in the interface engine and the control engine. In the prior art, all local service requests are processed locally at the terminal where the local services are requested. The computing devices of the prior art, such as personal computers and workstations, can process local requests because of their computing power, memory and display capabilities. The mobile devices in the present invention, however, taking advantage of a cooperation between the interface engine and the control engine over the wireless network, services the requests with the limited computing resources of the mobile devices and without significantly compromising overall performance.

Thus, unlike the closed and proprietary prior art mobile devices (e.g., mobile phones and two-way pagers), the present invention allows thinly designed mobile devices to become open application platforms. Such an open application platform allows software developers to develop value-added applications and services to these thinly designed mobile devices. Consequently, many more new uses can be developed for two-way communication mobile devices and two-way communication networks, including wireless networks, without physical modification or addition to the two-way communication mobile device.

The present invention can be implemented in numerous ways. For example, according to one embodiment of this invention, a method of the present invention allows an interactive two-way communication mobile device with a display screen to interact with a network server. In this method, a control engine in a link server is initiated when the mobile device establishes a communication session with the link server. (Such a link server couples the network server of a landnet, which uses a first communication protocol, to a wireless network which uses a second communication protocol.) The link server includes: (a) an account manager managing a user account associated with the mobile device; and (b) a message processor receiving a message from the network server over the landnet. Upon initiation, the control engine communicates with an interface engine of the mobile device corresponding to the user account, and converts the message, using the message processor, to a compact data file that can be efficiently transportable in the wireless network.

According to another embodiment of this invention, in a method of the present invention, the link server sends over the wireless network a compact data file it generates, and the interface engine renders the compact data file to cause the display screen to display contents represented by the compact data file.

According to still another embodiment of this invention, a system of the present invention includes: (a) a memory for storing code for a server module; (b) a data storage device for maintaining a user account for the mobile device; and (c) a processor coupled to the memory and the data storage device. The processor executes the code in the memory to cause the server module to: (a) execute a control engine associated with an interface engine of a mobile device; (b) receive a network message from the network server over the landnet, using a first communication protocol; (c) buffer the network message in a cache memory; (d) generate a compact message from the network message; and (e) send the compact message to the mobile device over the wireless network, using a second communication protocol.

According to still another embodiment of this invention, a system of the present invention includes: (a) a display screen; (b) an input means; (c) a memory for storing code for a client module; and (d) a processor coupled to the memory and controlling the display screen and the input means. The processor executes code in the memory to cause the client module to: (a) execute an interface engine when activating a predefined key; (b) maintain the interface engine to work with a control engine operating in the link server device in concert; (c) receive a compact message from the link server device over a wireless network, wherein the compact message is generated by a message processor in the link server device according to a network message received from the network server over a landnet; and (d) render the compact message to cause the display screen to display contents in the network message.

Accordingly, one of the objects of this invention is to provide a generic solution to two-way communication mobile devices with limited computing resources to enable them to effectively interact with a landnet such as the Internet.

Other objects, together with the foregoing are attained in the exercise of the invention in the following description and resulting in the embodiment illustrated in the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 6 demonstrates an overview of a systematic configuration according to the present invention;

FIG. 8B demonstrates an address table managed by an account manager to maintain groups of address identifiers in a link server for all the mobile devices in communication with the link server.

DETAILED DESCRIPTION OF THE INVENTION

Figure 1:
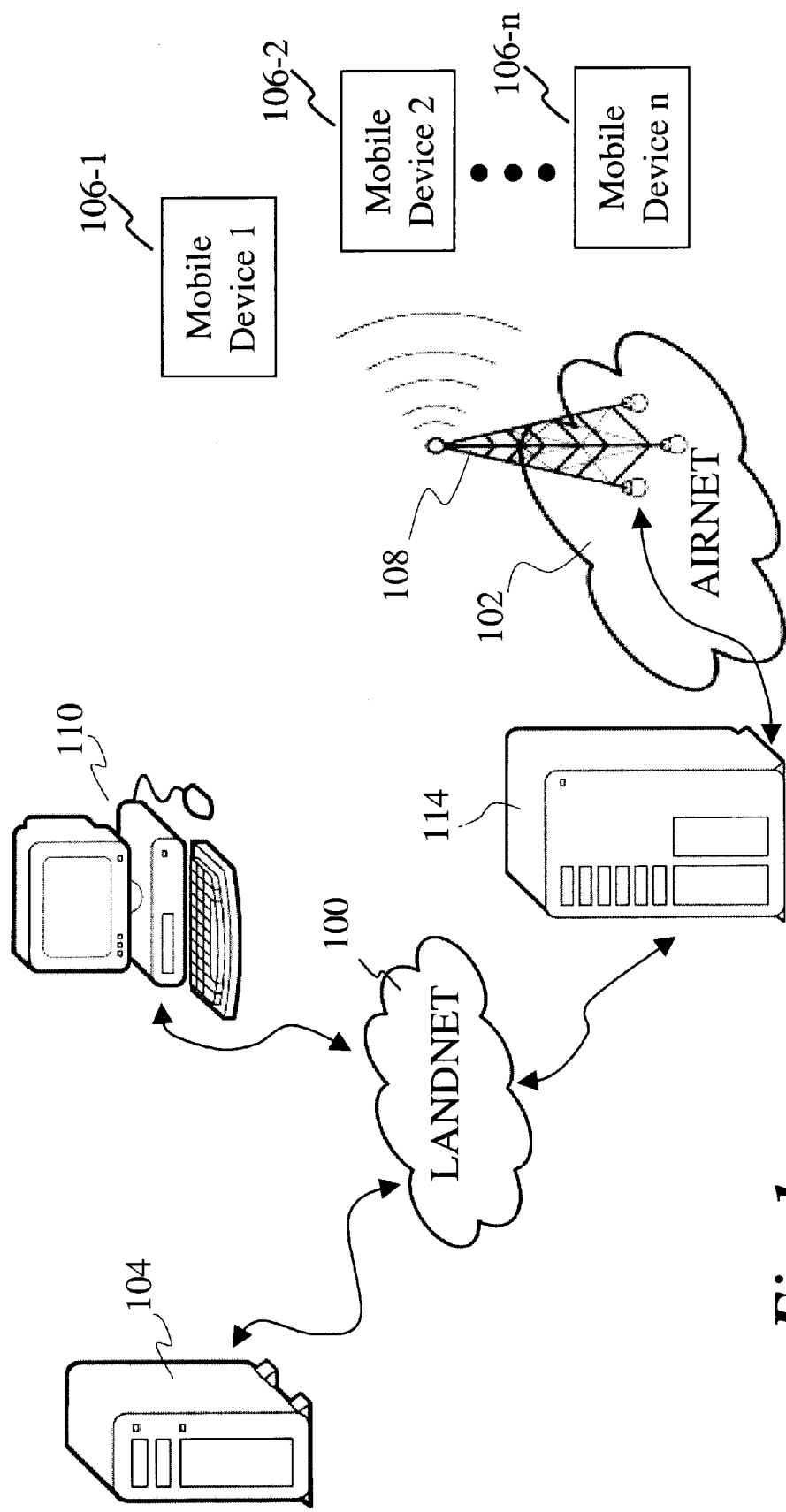
FIG. 1 illustrates a schematic configuration in which the present invention may be practiced.

Referring now to the drawings, in which like numerals refer to like parts throughout the several views. FIG. 1 illustrates a schematic configuration in which the present invention may be practiced. As shown in FIG. 1, landnet 100 is a land-based network that may be the Internet, an Intranet or a data network of any private network. Coupled to landnet 100 are a personal computer (PC) 110 and a network server 104. Personal computer 110 may be a Pentium II-based desktop personal computer. Preferably, personal computer 110 runs a HyperText Markup Language (HTML) browser, such as Netscape Navigator from Netscape Communications Corporation (http://www.netscape.com), via landnet 100 using HyperText Transfer Protocol (HTTP) to access information stored in network server 104, which may be a workstation from SUN Microsystems Inc (http://www.sun.com/). The information stored in network server 104 may be hypermedia information including mobile data designed for mobile devices.

There are n mobile devices 106 serviced by airnet 102. Mobile devices 106 are interactive two-way communication devices (e.g., mobile computing devices, cellular phones, palm-sized computing devices with PDA (Personal Data Assistants) functionality and Internet-capable appliance remote controllers) which are capable of communicating wirelessly with antenna 108 via airnet 102. As shown, antenna 108 also represents a wireless carrier infrastructure that generally includes a base station and an operations and maintenance center. The base station controls radio or telecommunication links with mobile devices 106. The operations and maintenance center comprises a mobile switching center performing the switching of calls between the mobile devices and other fixed or mobile network users. Further the operations and maintenance center manages mobile account services, such as authentication, and oversees the proper operation and setup of the wireless network. Each of the hardware components and processes in carrier infrastructure 108 are known to those skilled in the art and thus are not described here to avoid unnecessarily obscuring aspects of the present invention.

Between landnet 100 and airnet 102 there is a link server device 114 functioning as a bridge between the two networks 100 and 102. Link server device 114, which is also referred to as proxy server or wireless data server or network gateway server, may be a workstation or a personal computer. Link server 114, which is loaded with many processes including compiled and linked versions implementing the present invention, couples airnet 102 to landnet 100 and performs many functions as described in more detail below. One of the functions that link server 114 performs is to facilitate the communication of mobile devices 106 with any of the devices coupled to landnet 100, including mapping or translating from one communication protocol in landnet 100 to another in airnet 102 or vice versa.

Figure 2A:
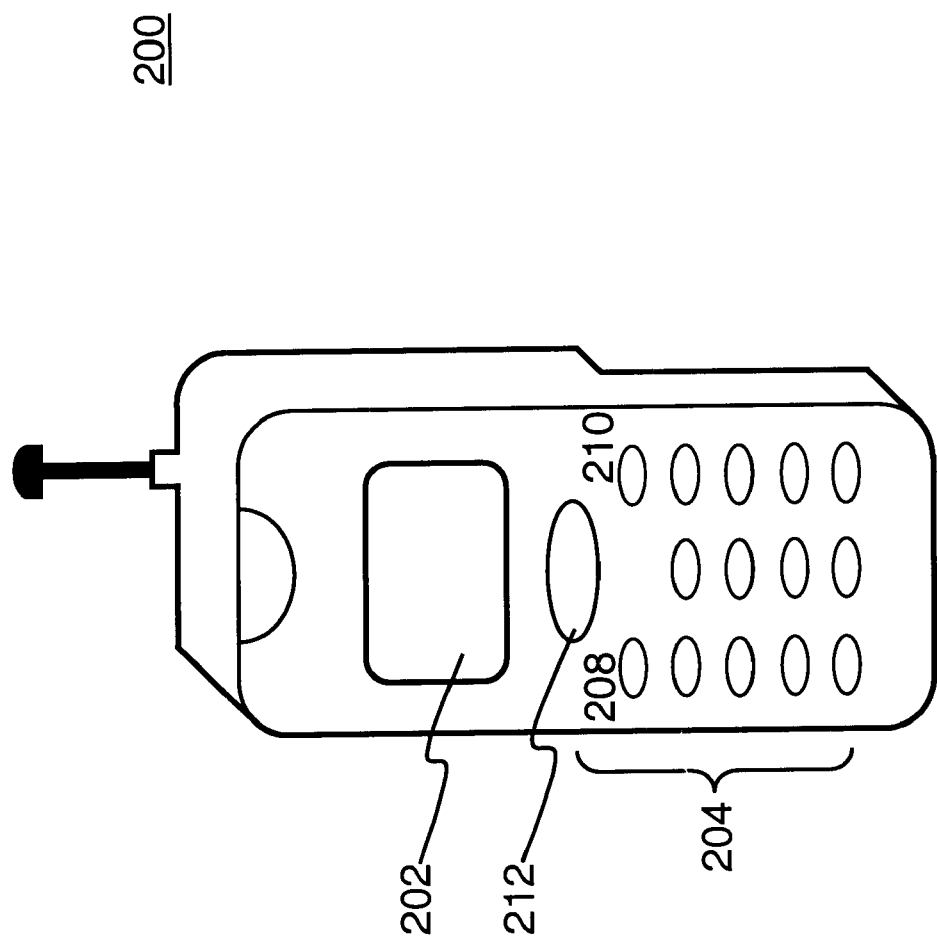
FIG. 2A depicts a block diagram of a typical GSM digital cellular phone that can be used in the data network of FIG. 1 to practice the present invention.

To facilitate the description of the present invention, FIG. 2A depicts a typical GSM digital cellular phone 200 that can be used as one of the mobile devices 106 in the arrangement of FIG. 1 to practice the present invention. Cellular phone 200 includes a small screen 202 and an extended phone keypad 204. Screen 202 is typically a LCD display capable of displaying perhaps four lines high by twelve or twenty characters with limited graphics capabilities. Extended phone keypad 204 includes, preferably, a regular phone keypad 206, a pair of generic keys 208 and 210 and positioning key 212. Generic keys 208 and 210 are used to activate soft keys displayed in screen 202 and positioning key 212 is to reposition an element indicator or a cursor to activate, for example, one of the hyperlinks displayed in screen 202. Generic keys 208 and 210 and positioning key 212 are not necessary in practicing the present invention. These keys can be replaced by a set of designated[]keys in regular phone keypad 206 but provide preferred convenient means for a user to interact efficiently with the phone 200. Further, having a regular phone keypad is not a requirement to practice the present invention. Some of the mobile devices have no physical keys at all, such as those palm-size computing devices that use "soft keys" or icons for receiving user input data. In the following, unless otherwise specifically described, keys or buttons are generally referred to as either physical keys or soft keys.

Figure 2B:
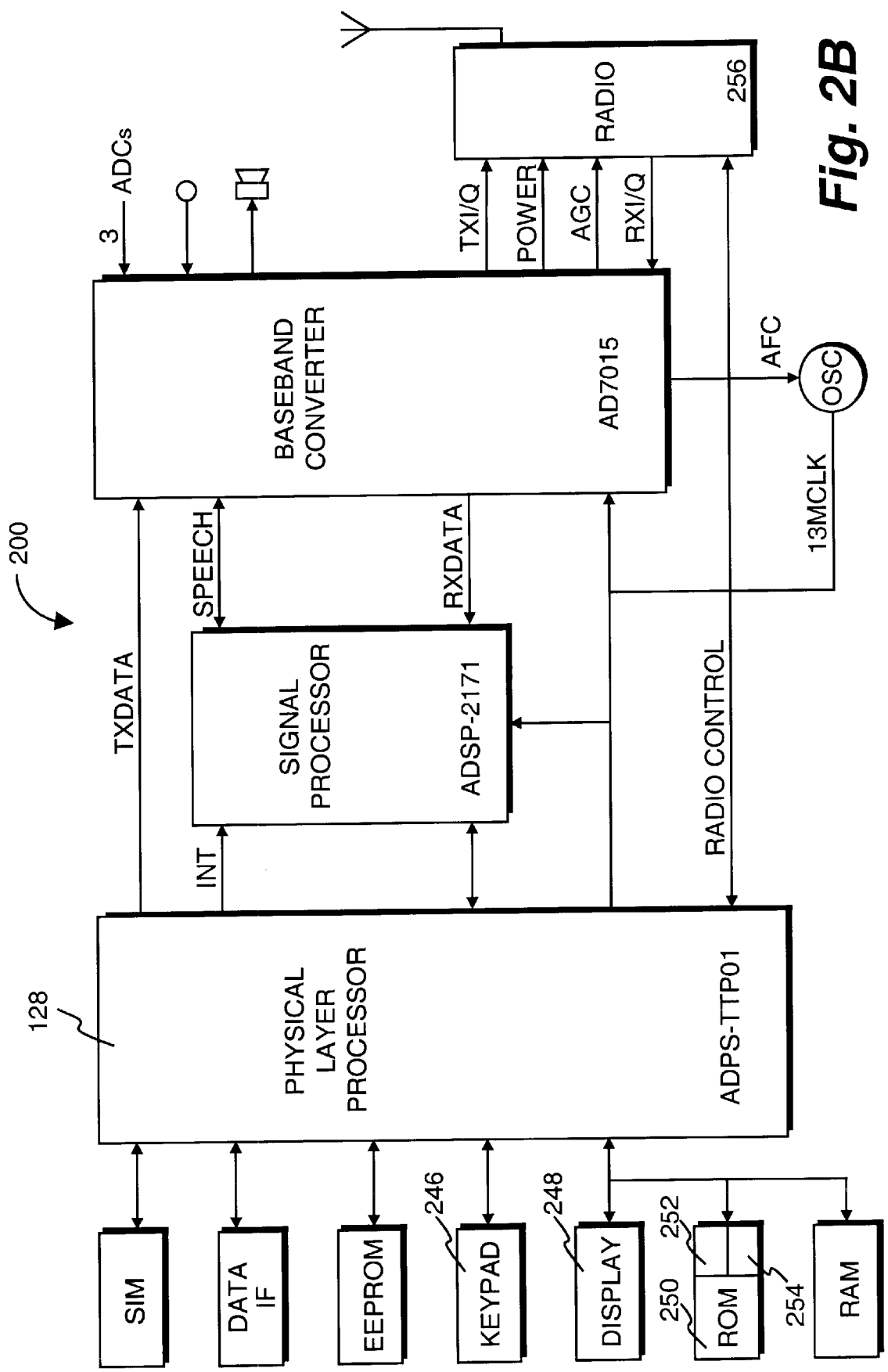
FIG. 2B illustrates an internal functional block diagram of an exemplary digital cellular phone that may corresponds to the GSM digital cellular phone of FIG. 2A.

FIG. 2B illustrates a functional block diagram of digital cellular phone 200. Since each of the hardware components in digital cellular phone 200 is known to those skilled in the art, the hardware components are not described in detail. Besides keypad circuit 246 for keypad 204 and display drive 248 for display screen 202, the main components in digital cellular phone 200 also include a random access memory (RAM), a read-only memory (ROM) and a physical layer processor or microcontroller 128. According to one embodiment, compiled and linked processes of the present invention are stored in ROM 250 as a client module 252 and a support module 254. Upon activation of a predetermined key sequence utilizing keypad 204, physical layer processor 128 causes client module 252 to communicate with link server 114 of FIG. 1 via a radio transceiver 256.

It is generally understood that a computing device equipped with an HTML browser using HTTP can access hypermedia information in a network server. However, HTTP requires considerable computing power and network bandwidth resources. For example, a request from a computing device to establish a communication session with a network server may require an exchange of a number of data packets. In addition to the resources required to implement HTTP, significant resources must be supported in the computing device to request, format, process and display information. This is not a significant disadvantage in many situations because the computing device, including personal computers and workstations coupled to a network operating HTTP, generally has sufficient computing power, memory and display capabilities.

Nevertheless, cellular phone 200 or mobile devices 106 of FIG. 1 typically do not have the computing resources to implement HTTP to run an HTML browser. The computing power in cellular phone 200 or mobile devices 106 of FIG. 1 is typically less than one percent of a laptop personal computer's computing power, the memory capacity is generally less than 128 kilobytes and the graphics display capability is very limited. Cellular phone 200 or any of mobile devices 106 of FIG. 1 is not a replacement of a desktop computing device or the combination of a wireless communication module and a personal computer. Further, making a mobile device, such as cellular phone 200, capable of navigating hypermedia information in a network server is a significant departure from prior art systems.

Figure 3A:
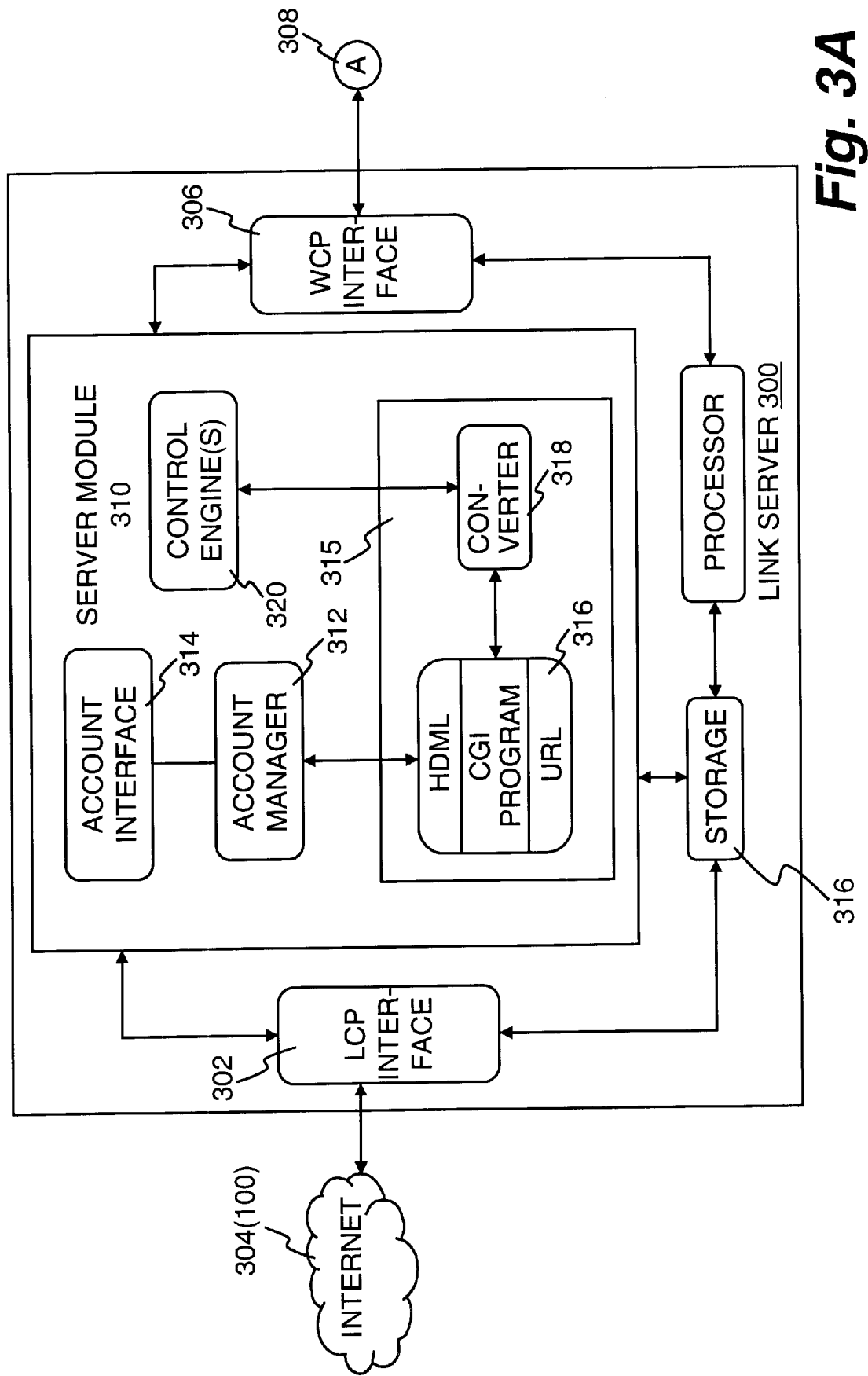
FIGS. 3A and 3B illustrate functional block diagrams of a link server device and a mobile device according to an embodiment of the present invention.
Figure 3B:
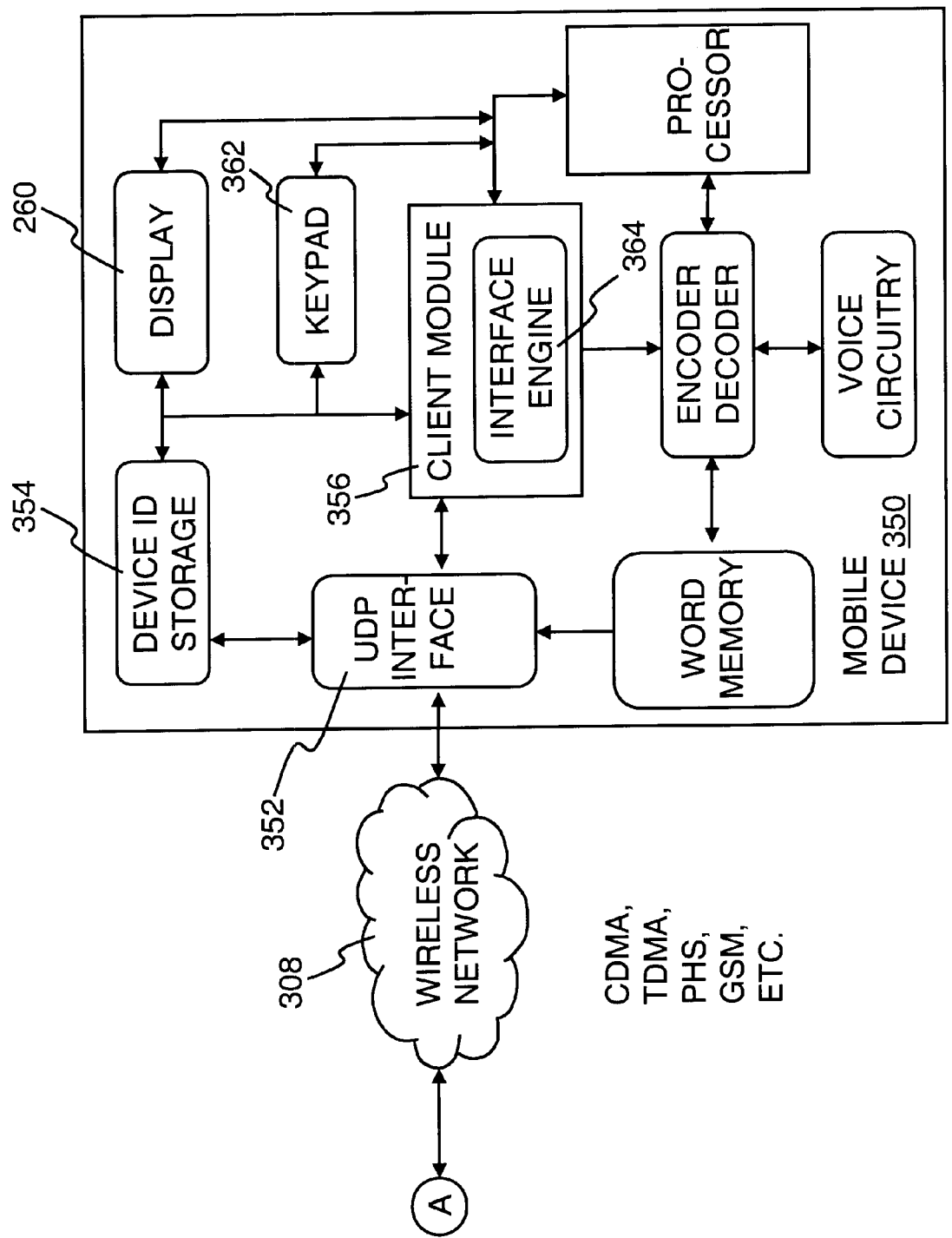

Referring now to FIGS. 3A and 3B, there are respectively shown functional block diagrams of a link server device and a mobile device according to an embodiment of the present invention. Link server device, or simply link server 300, that may represent link server 102 of FIG. 1, is typically a server computer. Mobile device 350 may, for example, correspond to one of mobile devices 106 of FIG. 1 or cellular phone 200 of FIG. 2. To avoid obscuring any aspect of the present invention, well known methods, procedures, components and circuitry in link server 300 and mobile device 350 are not described in detail.

Link server 300 includes a landnet communication protocol (LCP) interface 302 that couples to landnet 304, and a wireless communication protocol (WCP) interface 306 that couples to a wireless network 308 via a carrier's infrastructure (not shown in the figure). LCP interface 302 implements a communication protocol operated in landnet 304. Generally, landnet 304 operates HTTP, so that LCP interface 302 is typically an HTTP interface. Similarly, wireless network 308 may operate a wireless communication protocol suitable for the characteristics of a wireless network. One of the available wireless communication protocols is Handheld Device Transport Protocol (HDTP) (formerly known as Secure Uplink Gateway Protocol (SUGP)), which runs on User Datagram Protocol (UDP). In this embodiment, WCP interface 306 is implemented with a UDP or HDTP interface. HDTP is developed by Openwave Systems Inc. (formerly Unwired Planet, Inc.) located at 140 Seaport Boulevard, Redwood City, Calif. 94063. The specifications of HDTP, entitled "HDTP Specification" is enclosed and incorporated herein by reference in its entirety.

To facilitate the description of the present invention, the wireless communication protocol in use is HDTP. The present invention is, however, not limited by this exemplary communication protocol.

HDTP is a session-level protocol that resembles HTTP but runs on UDP and without incurring the overhead of HTTP/TCP and is highly optimized for use in thin devices, such as the mobile devices, that have significantly less computing power and memory than those of a desktop personal computer. Further, UDP does not require a connection to be established between a client device and a server before information can be exchanged, which eliminates the need of exchanging a large number of packets during a session creation. Exchanging a very small number of packets during a transaction is one of the desired features for a mobile device with limited computing power and memory to effectively interact with a landline device.

Link server 300 further comprises a server module 310 coupled between LCP interface 302 and WCP interface 306. Server module 310, which is typically loaded in a memory, performs traditional server processing as well as protocol conversion processing from one communication protocol to another communication protocol. In particular, the protocol conversion processing includes protocol conversion between HDTP/UDP and HTTP/TCP according to one embodiment.

In server module 310, account manager 312 manages through account interface 314 a number of user accounts for all the mobile devices serviced by link server 300. Each of the mobile devices, such as 350, is assigned a device identification (ID). Device ID can be a phone number of the device or an IP address or a combination of an IP address and a port number, for example: 204.163.165.132:01905 where 204.163.165.132 is the IP address and 01905 is the port number. The device ID is further associated with a subscriber ID created and administrated by a carrier in link server 300 as part of the procedures to activate a subscriber account for mobile device 350. The subscriber ID may take the form of, for example, 861234567-10900_pn.mobile.att.net by AT&T Wireless Service, and is a unique identification to a mobile device. In other words, each of mobile devices 106 serviced by link server 114 in FIG. 1 has a unique device ID that corresponds to a respective user account in link server 114. Additionally, account manager 312 is responsible for creating a user account for a mobile device that anonymously communicates with link server 114. In this case, account manager 312 ensures proper (limited) access of the anonymous mobile device to services provided by link server 114.

Figure 4:
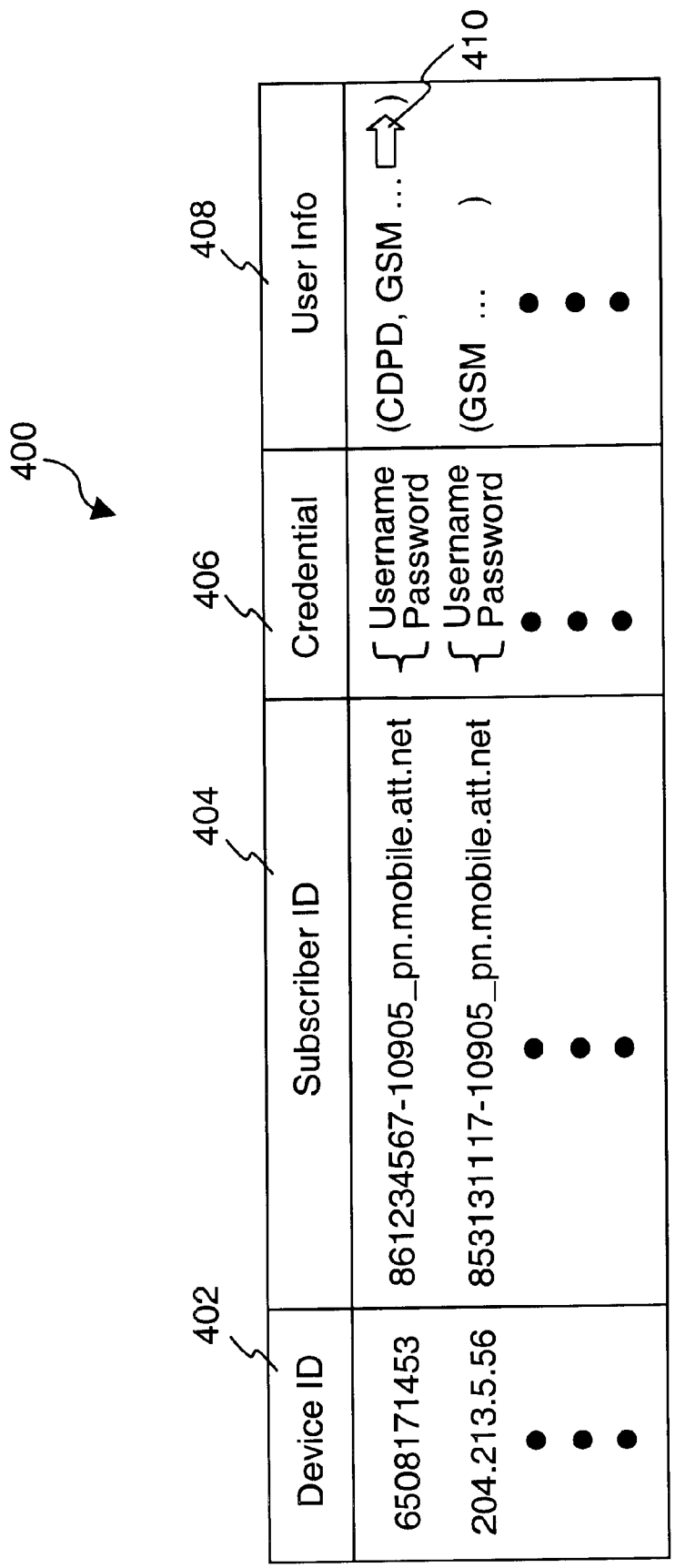
FIG. 4 depicts an account structure used in the description of the present invention.

FIG. 4 shows an exemplary structure 400 of the user accounts managed by account manager 312. It should be noted that the user accounts need not be physically located in link server 300. In fact, the user accounts can be remotely located in one of the computing devices coupled to the landnet 104. Through account interface 314 that has proper and secure access to the user accounts, account manager 312 can conduct the duties of account management, as discussed in further detail below. Device ID column 402 is filled with the device IDs of mobile devices that correspond to subscriber IDs in subscriber ID column 404. Credential information column 406 lists credential information needed to access each associated account. User info 408 may include the account configuration information, for example, device ID "6508171453" is a mobile phone that is pre-configured to work in a CDPD network and, probably, may be provided with an option to switch to a GSM network if necessary. Further entries in user info column 408 may include pointers or linkages 410 to other account-related information, such as system parameters, encryption schemes, call plan and customer service information that can be accessed by the mobile device.

Returning now to FIGS. 3A and 3B, a database of user accounts permits account manager 312 to authenticate and to verify the subscribed mobile devices and to control access to provided services by all mobile devices (subscribed or anonymous devices) via wireless data network 308. More importantly in the present invention, account manager 312 is responsible for managing the operations of control engines 320, which are respectively and independently designated to one mobile device. The detailed operations of control engines 320 are provided below.

The following description is focused on mobile device 350 and its associated account. However, the present description is equally applicable to any mobile device in communication with link server 300.

In addition, server module 310 includes message processor 315, which includes a message digester 316 and a converter 318. Message processor 315 processes messages communicated between a network server and link server 300 and generates for each message a corresponding compact message to be communicated between link server 300 and mobile device 350. In particular, message digester 316 receives the messages from the network server and performs a sequence of message processing that include interpretation and management of the messages. Converter 318 converts the messages, according to the interpretation, to a data format that is compact enough to be efficiently transportable over wireless network 308. The messages received from the network server are typically markup language files or data, requests, notifications and other commands that could cause mobile device 350 to respond as desired in the received messages. The markup language may include, for example, Handheld Device Markup Language (HDML), HyperText Markup Language (HTML), compact HTML, Wireless Markup Language (WML), Standard Generalized Markup Language (SGML) and Extensible Markup Language (XML).

For example, LCP interface 302 receives an HDML file from a financial network server that directs mobile device 350 to display a pre-designed screen, in response to mobile device 350's request to the financial network server. The exemplary HDML file is listed as follows:

<HDML VERSION=2.0>
      <DISPLAY NAME>
        <ACTION TYPE=ACCEPT TASK=GO DEST= #card2>
        Dow has hit 20,000 today!
        Nasdaq has popped 20%.
        Detailed Financial Headlines
      </DISPLAY>
    </HDML>

Figures 5A, 5B:
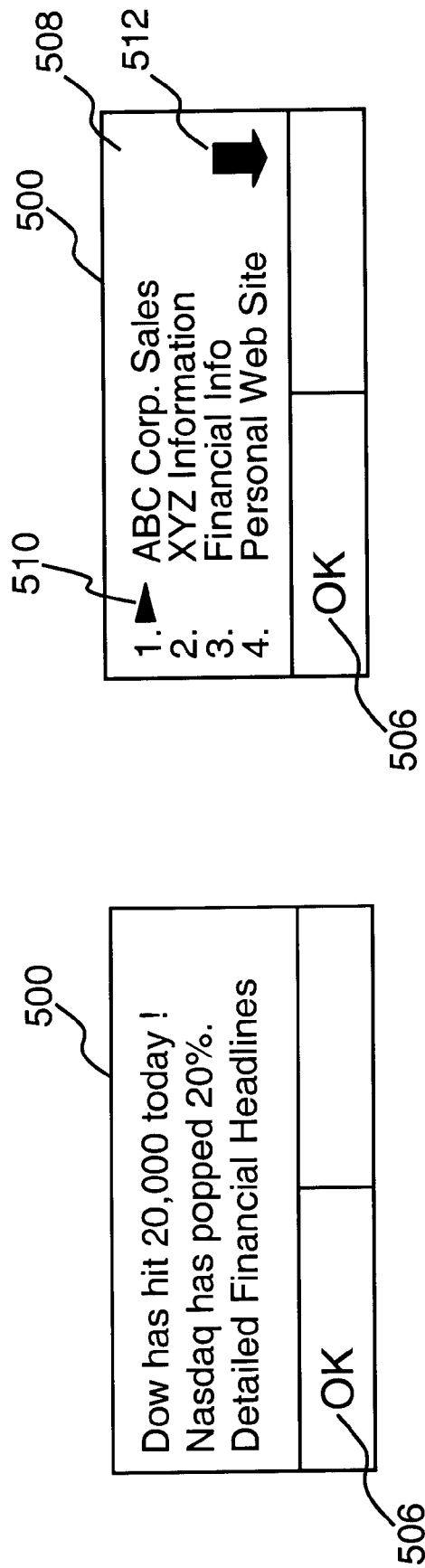
FIGS. 5A and 5B illustrate respectively two exemplary screen displays on a display screen of a mobile device.

The screen display corresponding to this HDML file is shown in FIG. 5A. If a user selects the "OK" soft key, a list of the detailed financial news packaged in one or more HDML files would be fetched (pulled) from the financial network server and displayed, as shown in FIG. 5B. As used herein, a display screen or screen is the physical display apparatus in a device, such as a 4 by 20 character LCD screen in a mobile device or 2.5 inch by 3.5 inch touch LCD screen in a palm-sized computer. A screen display is the image presented on the display screen. As shown in FIG. 5B, display screen 500 shows a list of choices with element indicator 510 pointing to the first choice. Pointer 512 indicates that screen display 508 has more items to be displayed but limited by the size of display screen 500.

As described above, mobile device 350 typically does not have the necessary computing power and memory to operate a browser in response to the HDML files. Therefore, an HDML file received is first analyzed by message digester 316 and then converted through converter 318 into a set of screen commands that cause a mobile device, upon receiving the screen commands, to display the contents in the HDML file according to the screen commands. Typically, the screen commands are expressed in a form of screen description data (SDD) that is rendered in an interface engine in mobile device 350. The following is an example of an SDD stream:

c353 c836 e003 446f 7754 0368 6173 5803 6869 74e0 0632 302c
    3030 3057 0574 6f64 6179 e001 2152 0844 6574 6169 6c65 64e0
    0946 696e 616e 6369 616c e009 4865 6164 6c69 6e65 73ff which is considerably smaller than the corresponding HDML file. The "ASCII-like" representation of the above illustrated SDD file is:

type=screen seq-num=54
    <WRAP>"Dow" offset=4 "has" offset=8 "hit"
    <WRAP>"20,000" offset=7 "today"
    <WRAP>"!" offset=2 "Detailed"
    <WRAP>"Financial"
    <WRAP>"Headlines"
    <end>

Transmission of a smaller data file is important in wireless data networks that are characterized with low bandwidth and expensive airtime. According to one embodiment, the SDD file is a group of Imp data, the detailed specification of the Imp data is provided in the Appendix entitled "Imp Specification protocols between Femto Engine and Terminal", which is hereby incorporated by reference for all purposes in its entirety. There are a set of rules or grammars in the Imp data that an interface engine, upon rendering the Imp data, causes a screen to display the contents of the corresponding markup language file.

In other words, the actual data being exchanged between link server 300 and mobile device 350 is in SDD format, which is typically binary and can be communicated more compactly and efficiently in wireless network 308. Further SDD files can be directly rendered by an interface engine in mobile device 350 without further processing. Nevertheless, the above procedures are provided for illustrative purpose only and the present invention is not limited to the Imp data format. According to another embodiment, the message processor does not have a pair of separate message digester and converter, a markup language file in HDML, compact HTML or XML is received at the message processor and converted into a corresponding binary file that is much smaller in size and may be in Imp, cHDML, cHTML, or cXML, wherein "c" means stripped, compressed, compiled or converted version of the corresponding markup files.

To interact with mobile device 350, server module 310 further includes control engine 320. Control engine 320 works in conjunction with an interface engine in mobile device 350 and further with message processor 315 to interpret actions from mobile device 350 in the present embodiment. More detailed description of the interactions between the interface engine in mobile device 350 and control engine 320 in server module 310 is given below.

Mobile device 350 includes a corresponding WCP interface 352 that couples to airnet 308 via a RF transceiver (not shown in the figure) to receive incoming and outgoing data signals. WCP interface 352 is implemented with a UDP interface, as is WCP interface 306, when wireless network 308 operates HDTP. When another wireless communication protocol is operated in wireless network 308, both WCP interface 352 and WCP interface 306 are readily implemented accordingly so that link server 300 and mobile device 350 can communicate with each other.

Device identifier (ID) storage 354 supplies a device ID to WCP interface 352. The device ID identifies a mobile device 350 and directly corresponds to the device ID in the user account in link server 300. In addition, mobile device 350 includes a client module 356 that performs many of the processing tasks performed by the mobile device 350. Such processing tasks include establishing a communication session with line server 300 via carrier network 308, requesting and receiving data from carrier network 308, displaying information on a display screen 360, and receiving user input data. Specifically, client module 356 is coupled to WCP interface 352 to establish a communication session and to request and receive data. Additionally, Client module 356 operates, among other things, an interface engine 364 that typically receives the screen description data from link server 300 and causes display drive 260 to display on the display screen what is intended in the HDML file originally received from the network server.

As mentioned above, in prior art systems, terminal devices typically run a local browser such as the one from Netscape or Microsoft to interact with the Internet. The present invention, however, uses an interface engine in a terminal device and a control engine in a proxy server. In other words, the present invention uses an interface engine demanding little computing resources in a wireless mobile device and a control engine utilizing sufficient computing resources provided in a server device to allow the mobile device to effectively interact with a network server. Further, working with the control engine in the link server, the interface engine in the mobile device does not need considerable computing power or memory to cache, parse, process and display a markup language file.

To facilitate further description of the present invention, FIG. 6 demonstrates an overview of a systematic configuration according to the present invention and should be understood in conjunction with FIG. 3. FIG. 6 shows that a mobile device 602 communicates with a network server 604 via link server device 606. Network server 604, or sometimes called service server, may be any server on the Internet that provides accessible hypermedia information. Mobile device 602 and link server 606 may correspond respectively to mobile device 350 and link server 300 in FIG. 3. Service server 604 having an IP address, for example, www.abcnews.com, provides hypermedia information to network 608 so that computing devices coupled to network 608 can access the information in service server 604.

According to one embodiment, the information in network server 604 is a World Wide Web page that may be authored in HDML and fetched over network 608 operating HTTP. From the perspective of mobile device 602 that ultimately receives the information, link server 606 receives the HDML files that are then processed by message processor 610 and converted to screen description data according to the device characteristics of mobile device 602. The device characteristics may include the type and size of display screen and other information passed over link server 606 when a communication session is established between mobile device 602 and link server 606. Generally, a request to establish the communication session can be initiated by either mobile device 602 or link server 606. During the process of exchanging authentication information, the data carrying the device characteristics of mobile device 602 is received and maintained in link server 606 such that the screen description data is generated in accordance with the device characteristics of mobile device 602. The detailed description of initiating the request and the processing of exchanging information so as to subsequently establish a secure and authenticated communication session is described in commonly assigned U.S. patent application Ser. No. 08/966,988 entitled "Method and System for Secure Lightweight Transactions in Wireless Data Networks" by Hanqing Liao et al, which is hereby incorporated by reference in its entirety.

With the established communication session, the screen description data are then forwarded to mobile device 602 over wireless network 614 operating a wireless communication protocol. Upon receiving and rendering the screen description data, interface engine 616 causes display screen 618 to display the information embedded in the screen description data.

FIGS. 7A through 7G show the processes of navigation requests by mobile device 602 of FIG. 6 and fetching requested information from service server 604 and forwarding the information subsequently from link server 606 to mobile device 602.

Prior to describing FIGS. 7A through 7G, some of the features in HDML are recited. Similar to HTML, HDML is a tag-based document markup language which includes a set of commands or statements specified in a card that defines how information is displayed on a small screen. Normally a number of cards are grouped into a deck that is the smallest unit of HDML information that can be exchanged between network server 604 and link server 606 over landnet 608. The HDML specification entitled "HDML 2.0 Language Reference" is enclosed and incorporated herein by reference in its entirety.

According to one embodiment of the HDML, there are four typical types of cards: a display card, a choice card, an entry card, and a no-display card. A display card gives information to be displayed to the user. The displayed content can include any one of, or any combination of text, image, and soft keys. A choice card displays a list of choices to the user. The choices are presented in a format specified on the choice card and are generally numbered sequentially. As explained above, the user selects a choice by depressing a corresponding key. An entry card is used to obtain input data from the user. An entry card displays one or more entry lines. The entry line, in this embodiment, can be used to receive either numeric or text data. A no-display card is a hidden card which is not displayed. The no-display card is normally used to execute an intermediate action and generally not known to a user. Regardless of its type, a card can contain text, soft keys and images.

In one aspect and from the perspective of a browser operating HDML, choice and entry cards prevent a user from moving to the next card until the requested information is received from the user. When the user reaches the last card in a deck and hits a corresponding key, a request for a new deck is initiated. The deck requested is determined by either the deck that the user has completed, or by the choices made by the user. When the deck is completed, the choices and/or data entered by the user are typically transmitted along with the request to a network server for a new deck. When a deck containing multiple cards is received and stored in a cache memory, the browser fetches the first card in the deck, displays the information in the card, and allows the user to respond thereto. Depending on the card type, the user responds by entering text or choosing an option, and then pressing a predetermined key to transact the response.

Figure 7A:
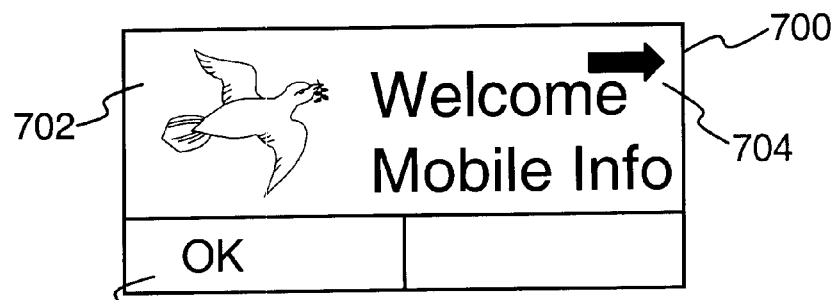
FIGS. 7A to 7G illustrate a series of screen displays to illustrate the navigation of the Internet through a mobile device according to the present invention.

FIGS. 7A through 7G should be understood in conjunction with FIG. 6 and with reference to FIG. 3. Upon establishing a communication session between mobile device 602 and server device 604, an initial HDML deck transmitted to link server 606 includes an introductory display card and a choice card. FIG. 7A is an example of introductory screen display 702 that is ultimately drawn on a display screen 700 of mobile device 602 by interface engine 616. FIG. 7A and the following figures are not interpreted directly from the HDML decks received, rather are interpreted from corresponding screen description data translated in link server 606 according to the HDML decks received therein. As described above, if working directly with the HDML files, the terminal (i.e., the mobile device) would require both considerable memory to cache the HDML files, history and activity states and sufficient computing power to run a browser to work with the cached HDML files. One aspect which differentiates the present invention fundamentally from prior art systems is that the control engine in the link server is responsible for tasks that require computing resources while the interface engine in the terminal is only responsible for rendering the screen description data to cause the display screen to display contents and receive inputs from a user. More specifically, the typical functions that the control engine in the link server perform include:

1. processing requests from the mobile device;
2. generating a URL request to a network server;
3. interpreting markup language files;
4. generating screen description data;
5. management of data cache;
6. management of history;
7. management of variable states in a markup language file;
8. maintaining push data, including alerts, electronic mails.

According to one embodiment, display screen 700 displays a graphical image. In another embodiment, display screen 700 displays only text. Screen display 702, and other screen displays described more completely below, include a horizontal arrow 704, i.e., a multi-screen indicator translated from a multi-card deck indicator, to communicate to the user that screen display 702 includes another screen display. To view the HDML file, a multi-card deck indicator indicates that the current deck includes another card. The inclusion of screen indicators, such as horizontal arrow 704, to communicate with the user is optional. The functionality of this invention is independent of such screen indicators.

Referenced by 706 is a soft key generally associated with one of the generic buttons in the keypad of the mobile device 602. A soft key can be used to map a generic button into a specified button or activated by a touch pen or a finger. In this instance, pressing the generic button or touching the key directly is equivalent to pressing an "OK" button when the soft key OK is displayed. In many palm-sized computing devices, the number of the keys is generally kept to a minimum so as to provide a larger display screen. The larger display screen can accommodate more soft keys, which can be directly activated using a touch pen. Soft keys thus provide an efficient means to interact with display screen 700.

When the user depresses a predetermined key (i.e. one of the generic buttons in this case), thus selecting a soft key, a client module in the mobile device 602 interprets the action and sends a request to link server 606. Upon receiving the request, control engine 609 in link server 606 interprets the request which is, in this instance, a request to display the next screen display. Control engine 609 calls converter 612 to retrieve the next card from the received HDML deck, preferably, cached in a memory in the link server and converts the card in HDML to a SDD file that is subsequently delivered to mobile device 602. Upon receiving the SDD file, interface engine 616 draws a new screen display as shown in FIG. 7B.

Figure 7B:
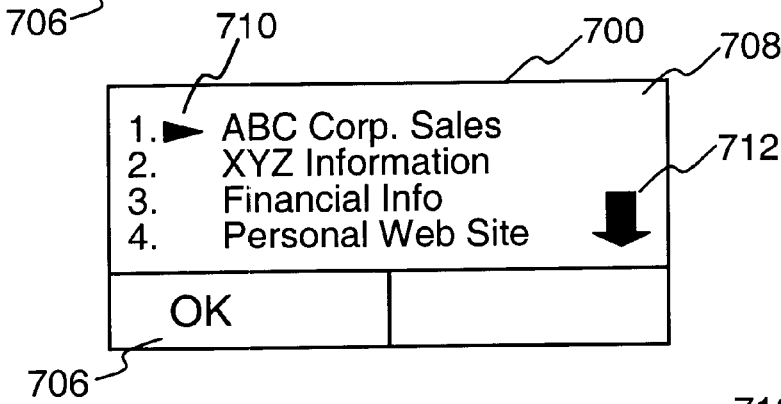
Figure 7C:
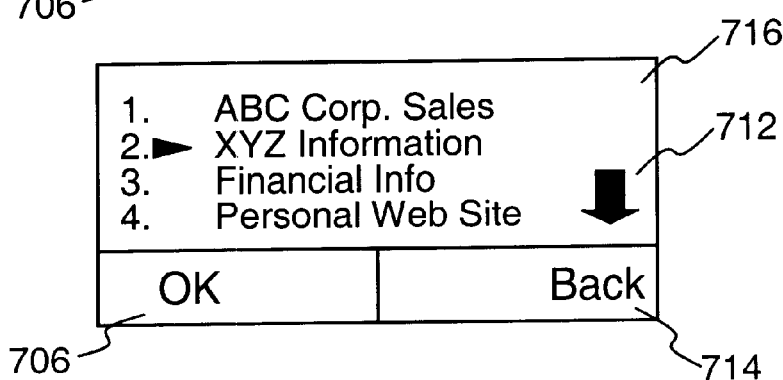

Screen display 708 in FIG. 7B shows a list of choices (the original HDML card is a choice card). Besides a list of choices that can be accessed by the user in FIG. 7B, there is a downward arrow which indicates that the screen display includes additional items that are not shown in display screen 700. The screen display can be larger than the number of lines available in the display screen 700 and so the user must scroll the screen display to view the complete screen. Thus, to view the additional items, the user presses the downward arrow key corresponding to the downward arrow indicator 712 on the display screen 700. In this embodiment, when the downward arrow key is pressed, each line of the display is rolled up one line. The resulting display has an icon with an upward arrow (not shown) if the menu requires only two screen displays. If the menu requires more than two screen displays, the second screen display of the menu would have two icons, one with the upward arrow and another with the downward arrow. To scroll between the various lines in the second menu, the user uses the downward arrow key, and the upward arrow key. If the user displays the last line of a card, e.g., the last line in the second menu, and presses the downward arrow key nothing would happen because the downward arrow icon, another soft key, will not be present. In this screen display, the user must make a choice before a next display screen is available.

In this embodiment, each of the menu items is available on service server 604 or distributed on several server computers coupled to network 608. As explained more completely below, each of the menu items in the original HTML file is associated with a numeral that corresponds to a resource locator in the card containing the menu items. The resource locator includes an address of a particular object associated with one of the menu items. In general, a resource locator includes a universal resource identifier (URI) or universal resource locator (URL) and may include appended data. The address can be referenced to another card in the deck cached in link server 606 or to a remote object on service server 604.

As shown in FIG. 7B, the first item in the menu 708 is initially indicated by an arrow 710 as a pre-chosen item. If the user decides to proceed with the pre-chosen item, the soft key "OK" may be pressed. Alternatively, a numbered key "1", i.e. one of the 10 numbered keys, can be pressed to cause the client module in mobile device 602 to send a new request to link server 606 for a next screen display. This new request, however, is not a simple request as the one from FIG. 7A. This request may include a resource locator to another card in the deck cached in link server 606 or a remote object in service server 604, depending on whether the original received HDML includes the information requested by the new request from mobile device 602.

This new request corresponds to a hyperlink in the card that has been converted to the SDD file currently being displayed in FIG. 7B. The hyperlink may include a URL as follows:

www.xyzinfo.com/Softcorp/sales where www.xyzinfo.com can be the URL of service server 604 and/sales may be a hyperlink in an object identified by/Softcorp in service server 604. More specifically, the card in the original HDML file may be expressed as follows:

<HDML version="2.0">
  <CHOICE>
    <CE TASK=GO DEST=www.abc.com/sales.hdml>
    ABC Corp. Sales
    <CE TASK=GO DEST=www.xyzinfo.com>
    XYZ Information
    <CE TASK=GO DEST=www.financialinfo.com>
    Financial Info
    <CE TASK=GO DEST=www.personalweb.com>
    Personal Web Site
  </CHOICE>
</HDML>

In the present example, each of the items in the menu displayed in FIG. 7B corresponds to a URL in the following, identifying a network server in the Internet:

www.abc.com/sales.hdml www.xyzinfo.com www.financialinfo.com www.personalweb.com When one item is subsequently chosen, the control engine will generate a URL request to the identified network server to retrieve the desired information.

Although converter 612 in link server 606 converts the above code to a SDD file, a much more compact format for transmitting over wireless network 614. A long address, like http://www.xyzinfo.com/LocalNews/Towns, typically cannot be compressed further. It is neither efficient nor wise to use the wireless network to communicate a number of long addresses in a file and return a URL request containing one or more of the addresses. Hence the present invention uses one or more address identifiers that are communicated over the wireless network. Each of the address identifiers identifies the full address. An address table is maintained in link server 606 that maps the address identifiers to the actual (full) addresses. The address identifying or address mapping methods described here are significantly different from prior art systems which send addresses to all hyperlinks in a markup language document along with the document to a terminal device.

Figure 8A:
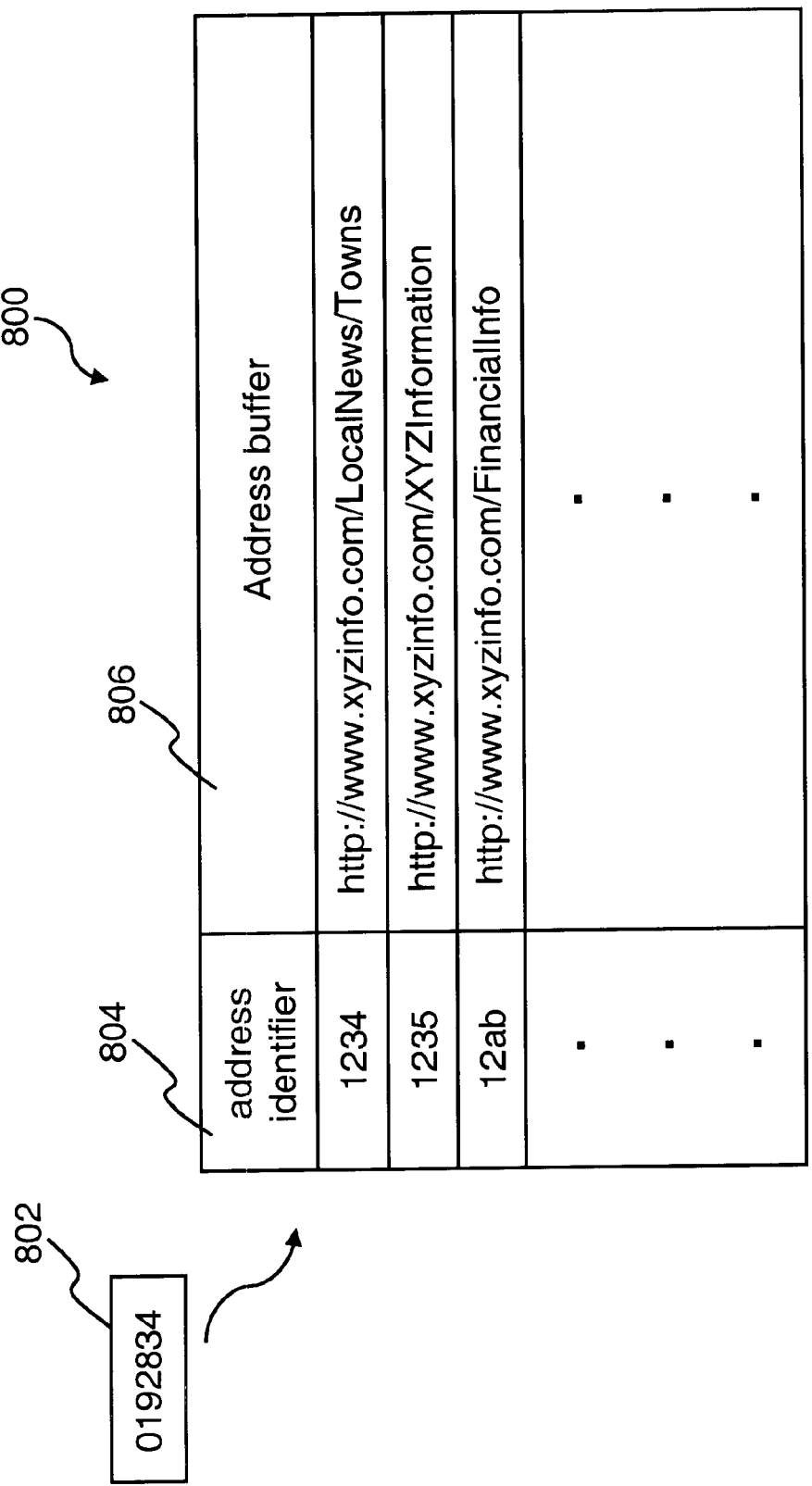
FIG. 8A demonstrates an address table per device to send an address identifier to an actual IP address over a wireless network.

FIGS. 8A and 8B show, respectively, two implementations of address mapping and should be understood in conjunction with FIG. 3 and FIG. 6. Address mapping table 800 is identified by a user ID 802. Address mapping table 800 includes address identifier column 804 and addresses into address buffer 806. Address mapping table 800 in FIG. 8A is typically established when a communication session between a mobile device and a link server is created. Each mobile device is allocated one address mapping table, and can be managed by the account manager in the link server. In other words, user ID 802 (e.g., a device ID or a subscriber ID) associates uniquely a mobile device to address mapping table 800. During the communication session, only the entries in address identifier column 804 are actually sent. For example, rather than sending over the entire resource locator http:/www.xyzinfo.com/LocalNews/Towns, address identifier "1234" is embedded in a SDD file that is delivered to the mobile device. Generally mapping table 800 in FIG. 8A vanishes when the session expires or terminated.

According to another embodiment, the account manager manages an address mapping table 800 shown in FIG. 8B, in which user ID column 802 includes identifications (e.g. device ID or subscriber ID) of all active mobile devices communicating with the link server. Address identifiers 804 includes all address identifiers corresponding to the actual addresses in address buffer 806. Thus, whenever a mobile device refers an address identifier to a resource locator, the actual address is retrieved from address buffer 806 using the address identifier and used in a URL request generated by the control engine to the identified network server.

According to another embodiment in which the SDD is a group of Imp data, the actual addresses are mapped to their relative positions in a final screen display. For example, the above four URLs are hyperlinks, according to the original HDML file, to be displayed one in each of successive lines. Thus their relative positions, line1, line2, line3 and line4, each corresponds to one of the URLs. The relationships between the relative positions and the actual URLs may be maintained in the address table discussed above or directly by the control engine. If a user eventually chooses one of the hyperlinks, a (client) request from the mobile device will include the chosen position. The request may be expressed as follows:

client request={SeqID, link, topline};

where "SeqID" ensures that the client request is synchronized with the Imp data fetched to the mobile device, from which the client request is produced, "link" is one of the parameters that indicates which link (URL) is chosen and "topline" is the position in the screen display from the Imp data. For example: client request={64, 2, 0}; Upon receiving the client request, the control engine processes the request and produces an updated request including the actual URL corresponding to the chosen position, for example {"http://www.xyzinfo.com"}, which causes a connection to the service server identified by the URL.

Returning to FIG. 7B, the user may scroll the choice arrow 710 downward if the pre-chosen item is not a wanted one. It should be noted that scrolling to a selected item is a feature that is specific to this example, and in general is not required to implement the invention. Other methods can be used to indicate the user's choice on display screen 700 such as a horizontal highlighting strip overshadowing the choice, if such an indication is desired. As described above, the user may simply key in one or more numerals to select an item that is of interest.

As described above, screen display 716 also includes the representations of two soft keys, an OK key 706, and a Back key 714. In this example, these soft keys are defined only for the card used to generate screen display 716. The "OK" key allows the user to proceed with the chosen item and the "Back" soft key allows the user to go back the previous screen display if so desired. In the present invention, the "Back" soft key may generate a request that is sent over to the link server from which the previous screen display is fetched again. Other keys can be implemented. For example a "Home" key, resulting in a request that returns the user to screen display 708 of FIG. 7B. The "Home" key may be associated with a resource locator identifying the card representing screen display 708. Specifically, the link server manages a limited history stack of recent requests made by the mobile device in a memory. When a request is made, the control engine looks up the history stack to see if the request is an "old" one. For example, when the "Home" key is pressed, the request can be found in the history stack and the contents, either in the form of an HDML card or an SDD file, can be retrieved from memory and forwarded to the mobile device for display.

As shown in FIG. 4C, the user moves arrow 710 downward to the second item. Display screen 716 shows four menu items numbered consecutively. As described above, the downward arrow indicates that there are more items in the next screen. Each of the items has an address identifier. For example, for the first four items, the respective address identifiers may be:

12ab

231a

1629 each address identifier correspond to an address stored in the address buffer of link server 606:

www.abc.com www.xyzinfo.com www.financialinfo.com www.personalweb.com

When the second item (i.e., 231a) is chosen, www.xyzinfo.com is intended. After a predetermined button is pressed (e.g., the soft key OK or the numbered button "2") is pressed, a request including the address identifier for the selection is transmitted to link server device 606 by the client module in mobile device 602 over network 614. Alternatively with regard to the specific Imp data implementation, the request includes the selection in terms of the relative position in a display screen as described above. In response to the selection, control engine 609 processes this request and formulates a new or updated request containing the actual URL identified in the client request, which causes a connection to service server 604. Through the server module, the link sever receives another HDML deck file from service server 604. Upon receiving the new HDML deck, message processor 610 processes the deck for the desired card and sends a corresponding SDD file derived from the desired card to mobile device 602.

Figure 7D:
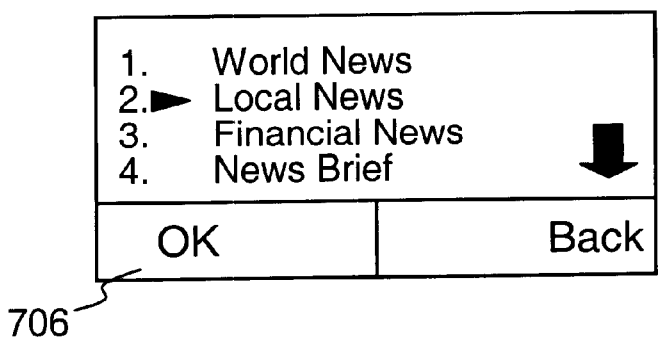

In FIG. 7D, there is shown a new screen display 718. Typically, it is from one of the cards in a new deck received in the link server as a result of the request from screen display 716. The deck is cached in the link server and the first choice card is converted to a SDD file that is rendered by the interface engine in the mobile device for display. If the user proceeds with any of the items, for example, "Local News", a request is made from the interface engine in the mobile device and received by the corresponding control engine in the link server. The control engine causes the message processor to retrieve a card identified by the request from the cache and convert the card to a SDD file and forwards the file to the mobile device for display.

Figure 7E:
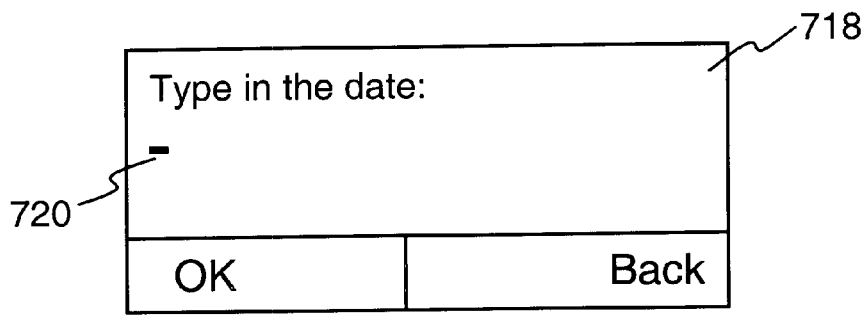
Figure 7F:
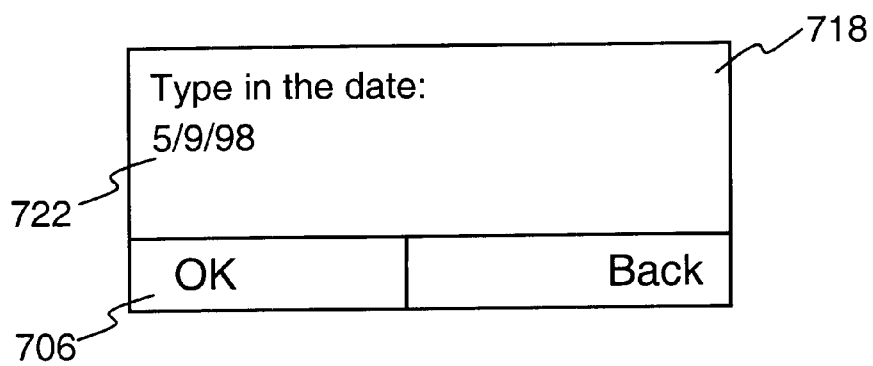
Figure 7G:
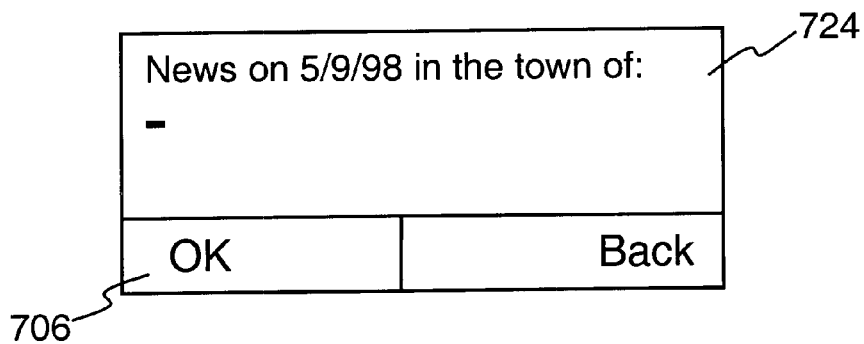

FIG. 7E shows a display screen 718 resulting from the "Local News" request. Display screen 718 asks the user for specific date information so that the news corresponding to the specified date can be provided. The original HDML card that corresponds to display screen 718 is an entry card that requires an input from the user. Hence the corresponding SDD file converted from the HDML entry card requires the input at cursor 720. FIG. 7F shows that the input 722, i.e. date information, is typed in. Upon pressing soft key "OK" 706, the interface engine sends a request including the input data to the control engine that performs variable substitutions. Variable substitutions, permitting sharing of data between cached cards, substitute the variable in the original HDML card with the actual information. As a result, an updated HDML card is locally and dynamically generated and then converted to a new SDD file that is returned to the interface engine for display. FIG. 7G shows a screen display 724 with the substituted data information. In this example, the updated HDML card is another entry card, hence screen display 724 asks for further information in order to deliver accurate information to the user. If the user supplies the "town" information being requested and presses the "OK" soft key, a request is made and sent to the link server in which the supplied information is used to substitute a corresponding variable and an updated request with the date and town information is generated. Typically, the updated request is sent to the network server supplying the information, but the updated request may be filled locally in the link server if the original HDML deck is large enough to include the desired information. Further detailed description of the management and processing of the variables in a markup language file is provided in commonly assigned U.S. patent application Ser. No. 09/071,235 entitled "Method for Inline Variables Management in a Hypermedia Display Language" by Peter F. King et al, which is hereby incorporated by reference in its entirety.

FIGS. 9A to 9G together constitute a process flow diagram showing the process performed by a link server device and a mobile device according to one embodiment of the present invention and should be understood in conjunction with FIGS. 3A to 3B and FIG. 6. At 904, link server device exchanges information with the mobile device to establish a communication session. The request to establish a communication session is initiated from the link server by sending a message to the targeted mobile device. The message includes a device identification of the mobile device. Upon receiving the message, the mobile device starts exchanging information with the link server. The exchanged information may establish the encryption keys and the encryption scheme to be used for the session. In addition, the mobile device delivers to the link sever a set of device characteristics information regarding the type and size of the display screen of the mobile device. At 906, the account manager in the link server associates the device information with the session just established. Typically the device information is cached in a memory along with other information about the mobile device. If the mobile device is an authorized device, there is a corresponding account that was established when the mobile device is activated. If the mobile device contacts the link server the first time, an account is established by the account manager. Therefore, the device characteristics information is always associated with the account of the mobile device.

At 908, the account manager assigns a control engine to work in conjunction with the interface engine in the mobile device. At 910, the account manager detects, through the server module, any message arrived. At 912, the source of the message is identified (i.e., whether the message is received from a network server or from the mobile device).

At 914, when the received message is from the network server, the control engine along with other modules in the link server determines the message type. In this embodiment, there are primarily two message types that are processed distinctively from the prior art systems. Specifically, these message types are notifications and markup language (ML) files. The notification or alert message indicates the arrival of an electronic mail or fulfillment of certain requests (e.g., sale of a stock at a limit price). The notification or alert message includes a device identification identifying the mobile device, an alert type (instructing the mobile device to beep, vibrate or display a visual sign), an alert title (a text string describing the subject matter of the alert), a life-time specifying a time period during which the alert should be delivered) and a URL that a user can request when the user desires to respond to the alert. Alternatively, an alert can be expressed as follows:

Notification$_{alert}$={023, "new mail", 4, www.wireless.com/ mail retrieval/87473}where "023" is a special code that can causes the mobile device to beep, the title "new mail" is then displayed on the screen of the mobile device, the value "4" specifies that the notification message be delivered within four hours or discarded, and the last entry in the notification is the URL to retrieve the new mail identified by "87473" from a mail server identified by www.wireless.com.

As indicated above, a notification or alert message is not always immediately deliverable; sometimes the mobile device is out of the service area or the mobile device is turned off. Consequently, the account manager of the link server maintains a notification list or an alert list for each mobile device. Upon receiving a new alert message, at 916, the account manager determines from an alert list if the newly arrived alert message correspond to a URL already on the alert list. If there is an identical URL in the alert list, at 920, the corresponding entry in the alert list is updated with the newly arrived alert message. If no identical URL is found, at 922 the newly arrived alert message is inserted. The newly arrived alert messages are sequenced in the alert list for delivery to the target mobile device.

At 924, the alert message is modified by substituting the actual URL by an address identifier retrieved from an address table. At 926, the modified alert message is sent to the mobile device over the wireless network. It should be pointed out that the above alert list update is not necessary if the newly arrived alert message is immediately delivered. Further it should be pointed out that the alert list may not be necessarily maintained in the link server device and, as will be explained below, may be maintained in the mobile device.

Returning to 914, wherein the received message from the network is a markup language (ML) files. At 938, the message processor in the link server processes the ML files. The processes at 938 may include caching the ML files in proper memory, parsing the ML files to generate internal data structure needed to generate SDD files. In particular, at 940 and 942 all the URLs in the received ML files are substituted by corresponding address identifiers, with the actual URLs stored in the address table maintained in the link server or the relative positions of URLs are determined with regard to the Imp data implementation. At 944, the message processor converts the processed ML files to SDD files corresponding to the mobile device's characteristics information, to allow proper display of the SDD files in the mobile device. To ensure that the control engine in the link server is in synchrony with the interface engine in the mobile device, at 946, the SDD files are respectively sequenced, preferably numbered consecutively and, at 948, delivered to the mobile device over the wireless network.

Returning to 912, wherein the message is from a mobile device. Typically, such a message includes one or more (client) URL requests. At 960, the control engine processes the message after the account manager verifies that such requests are permissible at 958. Depending on the services subscribed, each mobile device serviced by the link server may have the different privileges from other mobile devices to the services offered by the link server. If a request is granted at 958, the link server processes the request. Collectively, a (client) request may be expressed as follows:

client request={SeqID, Event, Choice, Link, AlterID, Topline, Entry, URL} where "SeqID" ensures that the client request is synchronized with a SDD fetched to the mobile device, from which the client request is produced. "Event" indicates what kind of request this client request is, for example, Softkey meaning a soft key activation, AlertSelect meaning that an alert has been responded to fetch a message in reference to the alert, and "Accept", "GotoURL" and "DeleteSelect", to name a few. "Choice" indicates which choice in a screen display has been chosen. "link" is one of the parameters that indicates which link (URL) is chosen. "AlterID" comprises one or more those address identifiers. "Topline" is the position in the screen display from the SDD and "Entry" typically holds inputs entered by a user and "URL", as the name suggests, holds an address enter by the user.

At 960, the request is processed. Generally, the request is to request information. In some instances, at 962, variables in the requests are substituted to provide an updated request, as explained below.

According to one aspect of the invention, variables are used to hold user input data. Such user input data can be collected, for example, in response to a query provided to the user in a display screen. When the user input data (e.g., a number) is entered by the user, the user data received is provided on the next display screen to provide feed back to the user. Specifically, the link server receives an ML file in which are defined a number of variables. The variables in the ML file constitute information to be requested at a terminal device. When the ML is converted to a corresponding SDD file to be displayed on the mobile device, in response to the display screen, the user enters the required input data and a request is dispatched containing the input data to the link server, after a predefined key is pressed. In prior art systems, a terminal device running a browser performs the substitutions locally. In the present invention, the mobile device operates only an interface engine without the capability of performing the substitution. The substitutions are performed by the control engine in the link server when the request from the mobile device is received at 964. The link server responds to the request by sending the mobile device a new SDD file that has the user data substituted for the variables at 966.

According to another aspect of the present invention, some values received from the mobile device for variables in the ML files are provided as address identifiers that must be substituted with the actual URLs. Examples of a request including address identifiers include a new information request to a network server or a request to retrieve email. Upon receiving such a request, the actual URLs are retrieved by the account manager from an address table in the link server. At 968, the original requests from the mobile device are modified to produce updated requests with the actual URLs substituted and the updated requests are then sent to the identified network server(s) corresponding to the URLs at 970.

Figure 9A:
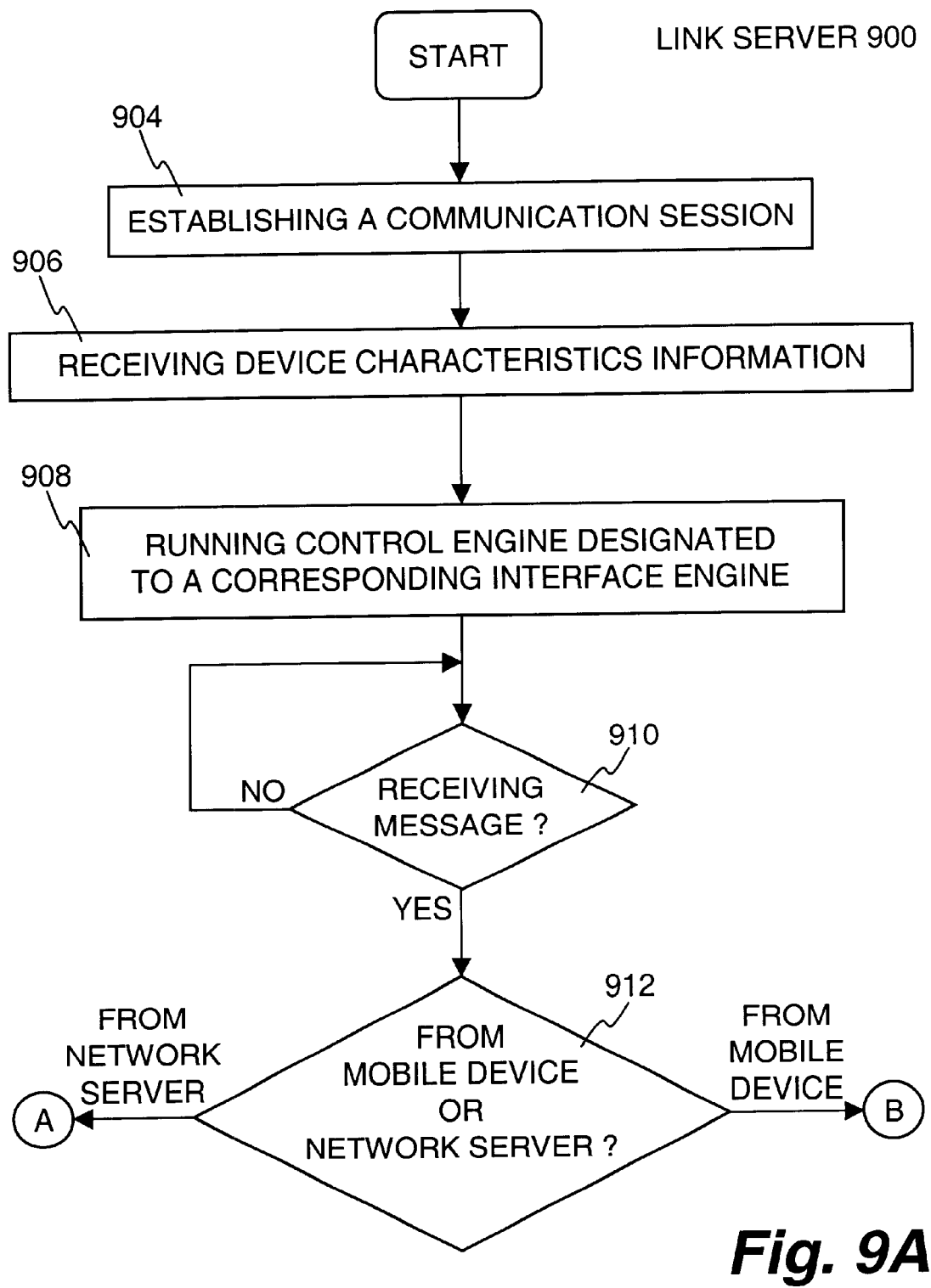
FIGS. 9A and 9G illustrate a process flowchart of the present invention according to one embodiment.
Figure 9B:
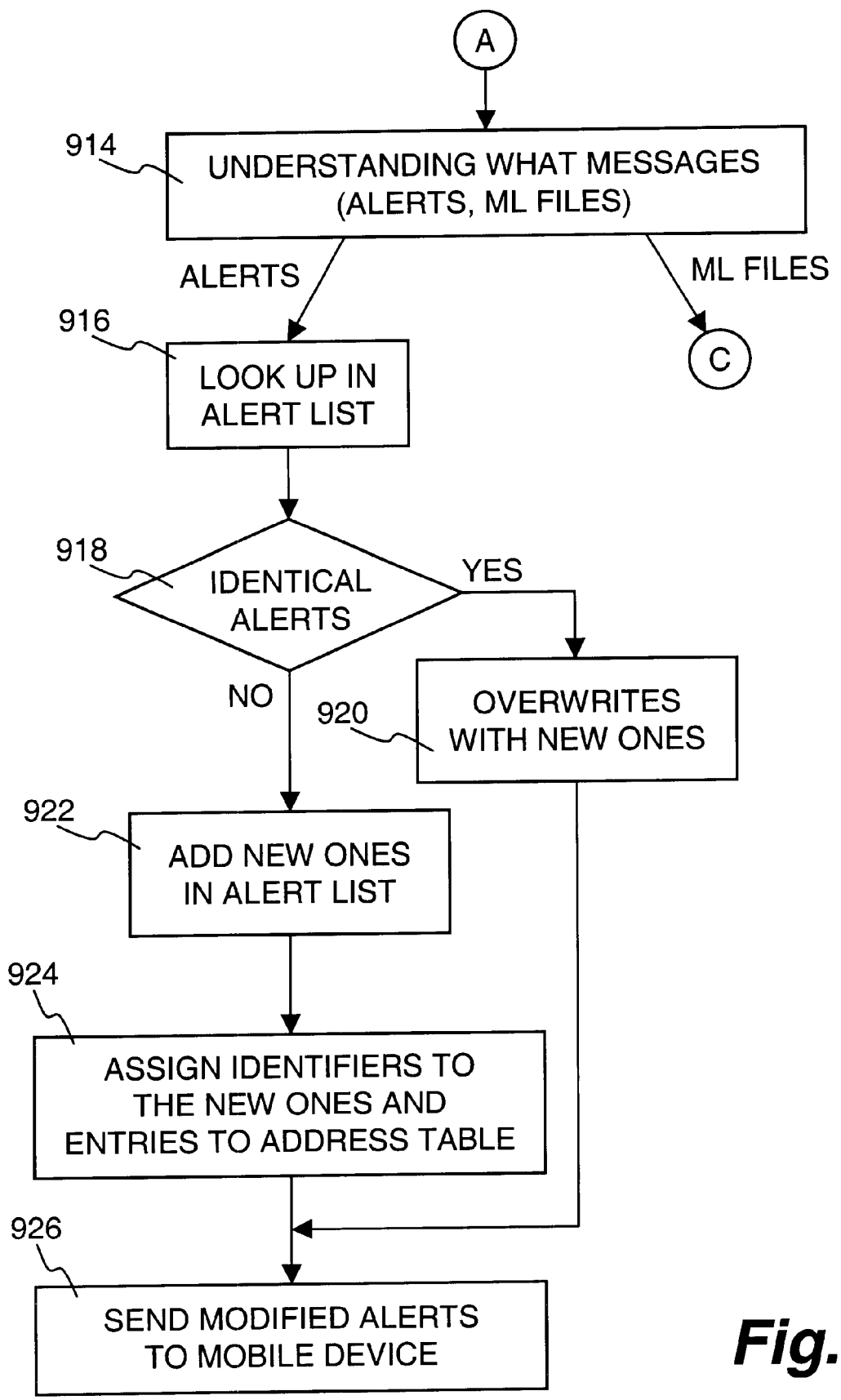
Figure 9C:
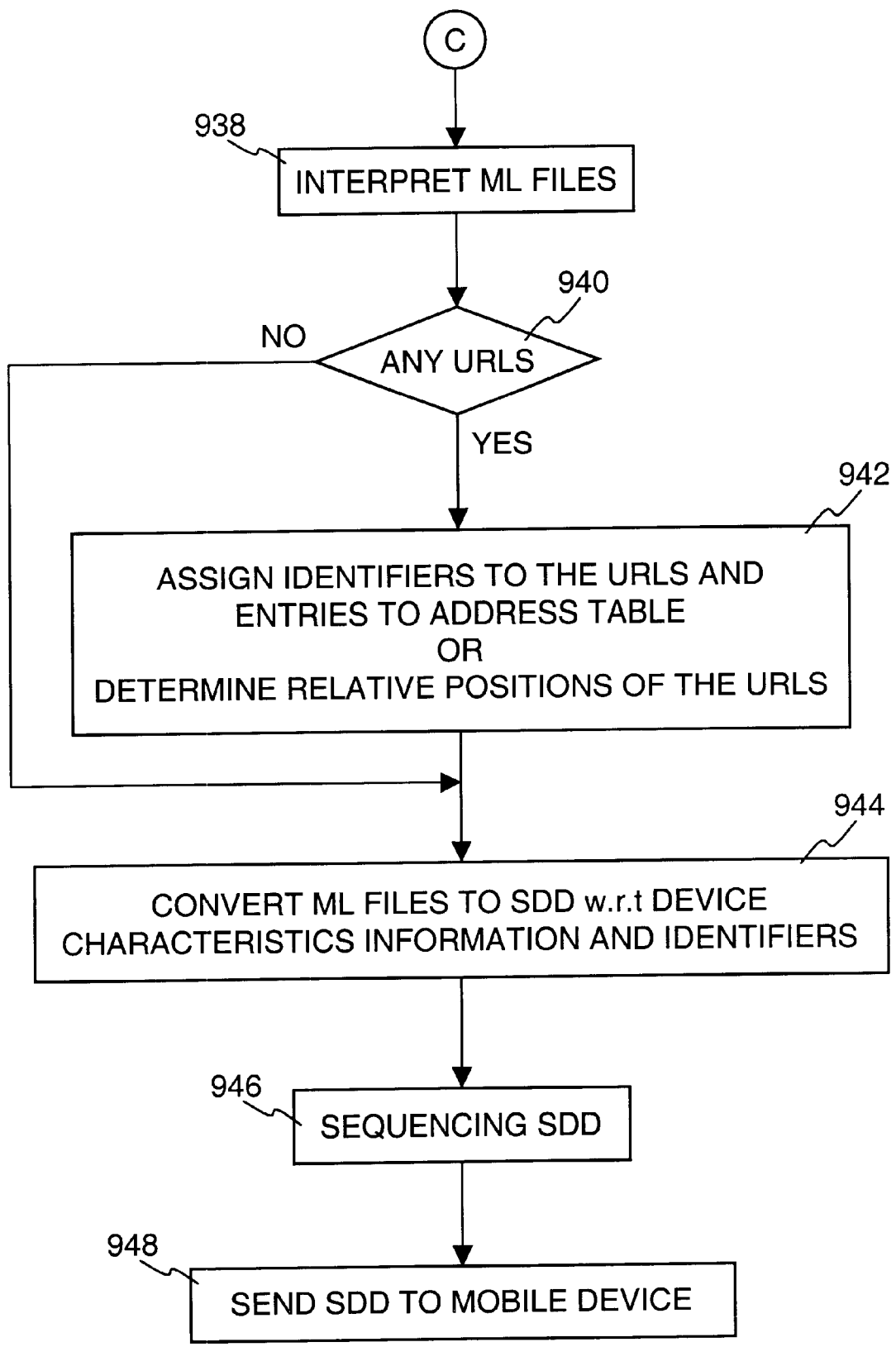
Figure 9D:
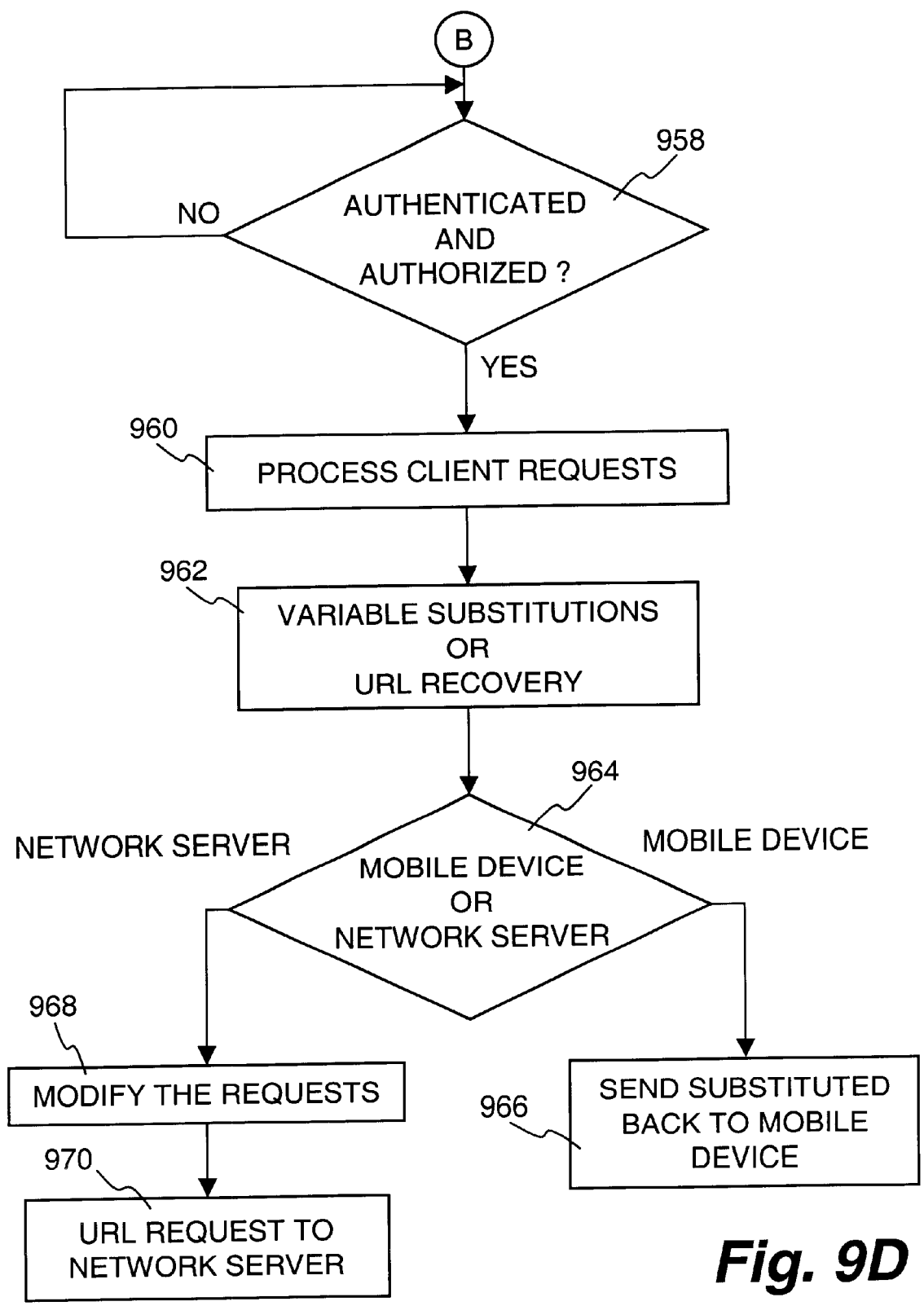
Figure 9E:
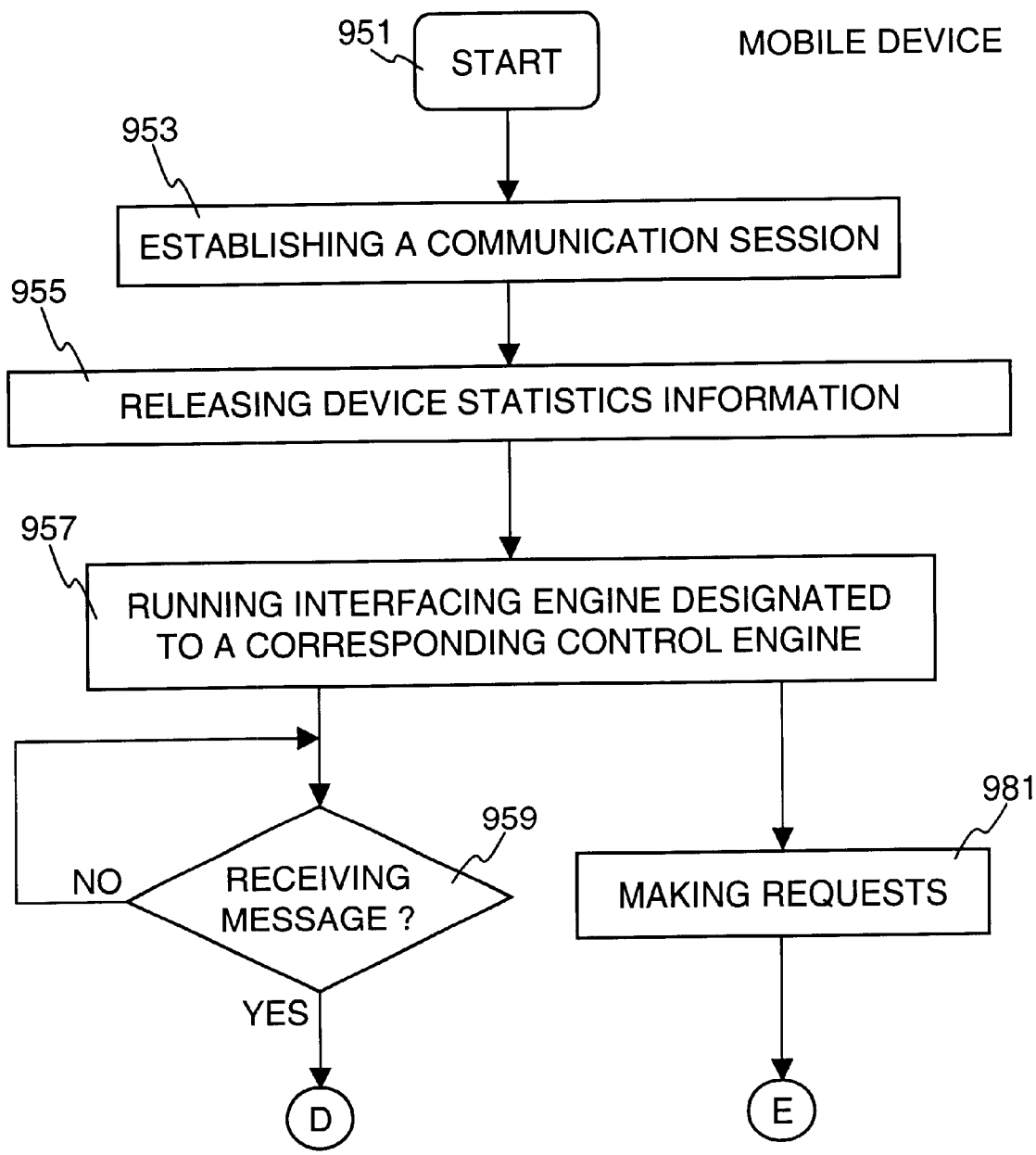
Figure 9F:
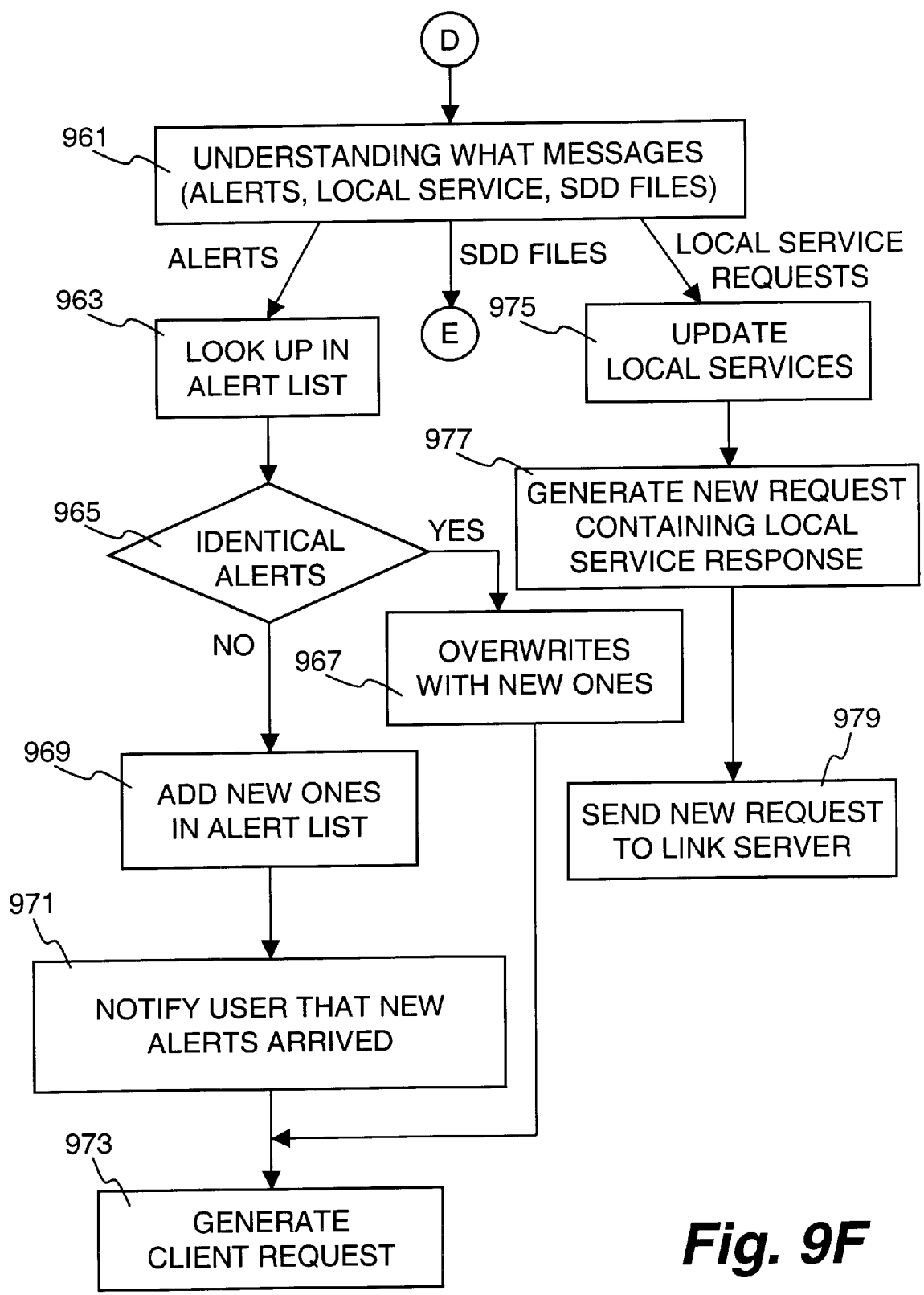
Figure 9G:
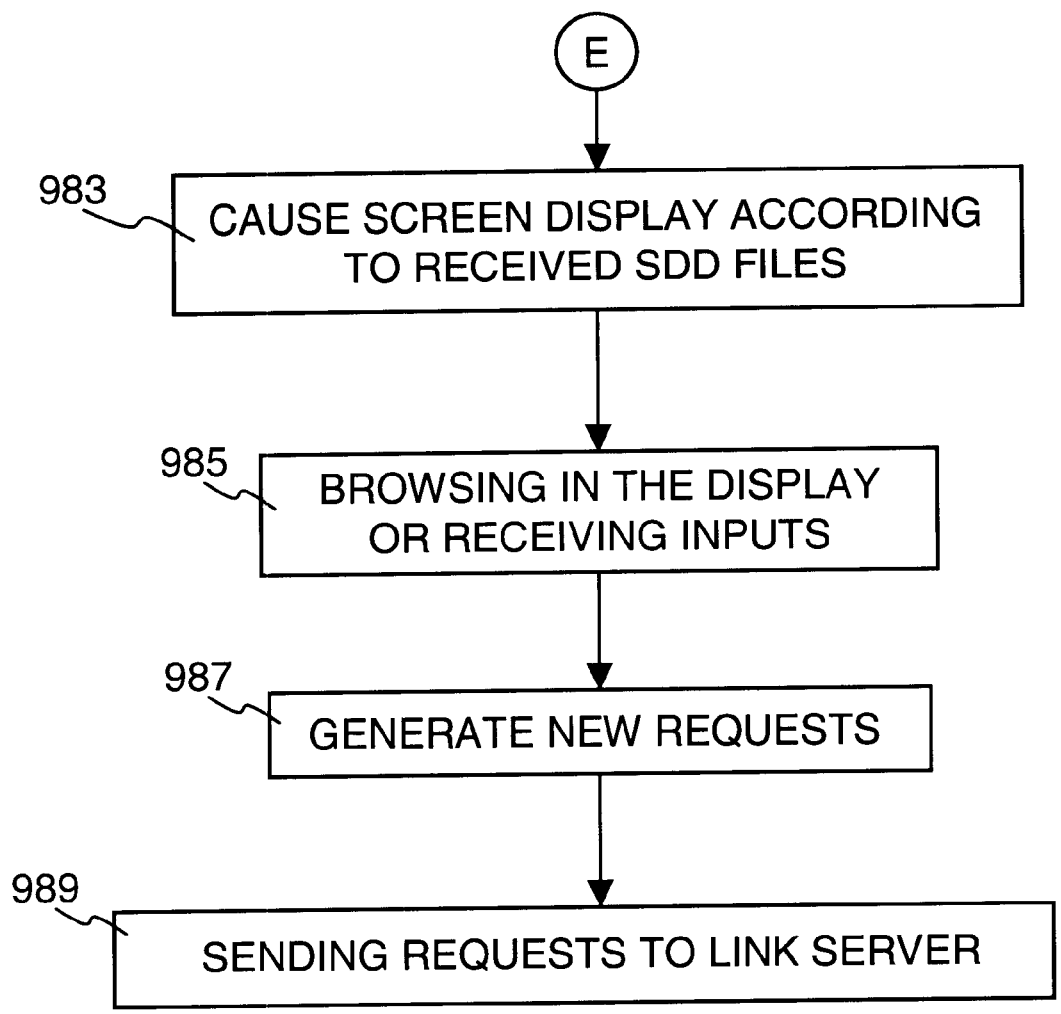

FIGS. 9E to 9G constitute a process flow diagram of the mobile device, which corresponds to processes in the link server. At 953, the mobile device exchanges information with the link device to establish a communication session. The request to establish a communication session can also be initiated from the mobile device by sending a message to the link server. Besides a device identification of the mobile device, the message includes a URL of the link server. To establish the communication session, device characteristics information is released to the link server. Such characteristics information may include the size and type of the display screen of the mobile device. After the communication session is established, the interface engine works at 957 with the control engine in the link server.

At 959, the client module in the mobile device receives a message. Typically the mobile device receives three kinds of messages: notifications, SDD files and local service requests. At 963, a notification message arrives. Note that a notification message received at the mobile device is different from the notification or alert message provided from a network server. The notification message received at the mobile device is a distilled version with no explicit URLs. Upon receiving the notification message, the client module looks up in an alert list in the mobile device to determine if there is an identical notification pending there at 965. Sometimes a user of the mobile device may not necessarily or immediately respond to an alert, the mobile device hence maintains an alert list to keep all the received notification or alerts. If a notification identical to the newly received notification message is found, the alert list gets updated with the newly arrived notification message at 967. Otherwise, i.e., no identical notification message is found in the alert list, the newly arrived notification message is added sequentially into the alert list at 969. Meanwhile, the user is notified according to the alert type in the received notification message at 971. When the user decides to respond to the notification and presses a key or activates a soft key, a request corresponding to the notification message is sent to the link server at 973.

At 975, a message is received requesting an update to the local services in the mobile device. Local services may include functions for modifying wireless voice/date protocols, configuration or system parameters, bookmarks, addresses, subscriber provisioning information and other parameters that may enable or disable certain telephony and data features of the mobile devices. Technically, the interface engine recognizes such a message by a special prefix indicating a "local service" request. According to one embodiment, a URL for a local service always begins with "device:". (e.g., device:addressbook).

Upon the arrival of a local service request, the local service in the mobile device is invoked. For example, a user may navigate to a page providing email service to the mobile device. After a key is pressed or a soft key is activated, a request is sent to the control engine of a link server, which in turn responds by a local service request which causes an address book to be displayed in the mobile device. After the user makes a selection from the address book, at 977, the mobile device sends another request specifying the selected address to the control engine which then sends the mobile device an SSD file. Upon receiving the SSD file, the display screen displays a page which allows the user to proceed with composing a mail message.

At 981, when the received message is an SDD file. Upon receiving the SDD file, the interface engine renders the SDD file and causes the display screen of the mobile device to display according to the SDD file at 983. Within the display screen, the user may browse the screen display at 985 by pressing a navigation key to reposition a cursor to a subject of interest. For further information on the selected subject, the user may press a predefined key; hence a URL request is generated at 987. Also at 985, the user may be asked for input data to some context. Once the input data is entered, the user may press a predefined key, such as the "OK" key to generate a URL request at 987. The URL request is then sent to the link server for processing at 989.

The present invention is described above by way of example using specific embodiments. Numerous changes and modifications can be made within the scope of the invention claimed below.

What is claimed is:

1. A method for an interactive two-way communication mobile device of a wireless network to interact with a network server, the mobile device having a display screen, the method comprising:
   initiating a control engine in a link server device coupled to a landnet after the mobile device establishes a communication session with the link server device over the wireless network, through a pair of first and second protocol interfaces, the first protocol interface residing in the mobile device and the second protocol interface residing in the link server device, the link server device comprising:
   an account manager managing a user account of the mobile device; and
   a message processor receiving a message from the network server over the landnet;
   associating the control engine with an interface engine operating in the mobile device corresponding to the user account, and
   converting the message by the message processor to a compact data file that can be efficiently transportable in the wireless network, including substituting a uniform resource identifier in the message with a corresponding address identifier while maintaining the uniform resource identifier in the link server device.

2. The method as recited in claim 1, wherein the message received from the network server represents a World Wide Web page.

3. The method as recited in claim 2, the method further comprising forwarding device characteristics information of the display screen from the mobile device to the link server device over the wireless network.

4. The method as recited in claim 3, wherein the compact data file is screen description data that can be directly rendered by the interface engine in the mobile device.

5. The method as recited in claim 4; wherein the message comprises a device identifier identifying the mobile device.

6. The method as recited in claim 4; the method further comprising buffering the message in a cache memory in reference to the user account of the mobile device in the link server device.

7. The method as recited in claim 6; wherein said converting the message by the message processor to a compact data file comprises converting the message to the screen description data corresponding to the device characteristics information received from the mobile device.

8. The method as recited in claim 7; the method further comprising causing the display screen by the interface engine, upon receiving the screen description data, to display the contents in the message from the network server according to the screen description data from the link server device.

9. The method as recited in claim 8, the method still further comprising:
   navigating in the contents being displayed on the display screen of the mobile device;
   generating a client request by a client module in the mobile device; and
   sending the client request to the link server device over the wireless network; and
   forwarding the client request to the network server over the landnet.

10. The method as recited in claim 9, wherein said generating a client request comprising making a selection in the contents by activating a predefined key.

11. The method as recited in claim 9, wherein said generating a client request comprising receiving inputs from a user by using an limited input interface of the mobile device.

12. The method as recited in claim 11, wherein the limited input interface comprises a phone keypad equipped in the mobile device.

13. The method as recited in claim 11, wherein the limited input interface comprises a number of soft keys displayed on the display screen of the mobile device.

14. The method as recited in claim 6; wherein said converting the message by the message processor to a compact data file comprises:
   generating the screen description data from the message with the corresponding address identifier.

15. The method as recited in claim 14; wherein said substituting the uniform resource identifier comprises storing the uniform resource identifier in an address table managed by the account manager in the link server device.

16. The method as recited in claim 15; the method further comprising causing the interface engine, upon receiving the screen description data, to display on the display screen contents in the message from the network server according to the screen description data from the link server device.

17. The method as recited in claim 16, the method still further comprising:
   navigating in the contents being displayed on the display screen of the mobile device;
   generating a client request by a client module in the mobile device; and
   sending the client request to the link server device over the wireless network.

18. The method as recited in claim 17, wherein said generating a client request comprises:
   making a selection in the contents by activating a predefined key, the selection linking to the address identifier; and
   forwarding the client request to the network server over the landnet.

19. The method as recited in claim 18; further comprising:
looking up the address table for the address identifier;
replacing the address identifier with the uniform resource identifier from the address table;
forming a new client request in the link server device; and
sending the new client request to the network server over the landnet.

20. The method as recited in claim 17; wherein said generating a client request comprises receiving inputs from a user using a phone keypad of the mobile device.

21. The method as recited in claim 20; the method still further comprising:
substituting variables in the message with the inputs in the link server device to produce an updated message;
converting the updated message to an updated screen description data corresponding to the device characteristics information received from the mobile device; and
sending the updated screen description data to the mobile device over the wireless network.

22. The method as recited in claim 1, wherein the message received from the network server is a markup language file.

23. The method as recited in claim 22, wherein the markup language is selected from a group consisting of Handheld Device Markup Language (HDML), HyperText Markup Language (HTML), Wireless Markup Language (WML), Standard Generalized Markup Language (SGML) and Extensible Markup Language (XML).

24. The method as recited in claim 1; wherein the message received from the network server is a notification comprising a device identifier identifying the mobile device by the account manager and a universal resource identifier identifying a service web site.

25. The method as recited in claim 24; wherein said converting the message by the message processor to a compact data file comprises:
looking up in a notification list managed by the account manager for an entry substantially equivalent to the received notification in the link server device;
updating the notification list with the received notification;
substituting the uniform resource identifier with a corresponding address identifier;
storing the uniform resource identifier and the corresponding address identifier in an address table managed by the account manager in the link server device; and
converting the notification with the uniform resource identifier substituted by the address identifier to the compact data file.

26. The method as recited in claim 25; wherein said updating the notification list comprises:
replacing an entry with the received notification if the entry is identical to the received notification in the notification list; and
inserting the received notification into the notification list if there are no entries that are identical to the received notification in the notification list;
wherein the inserted received notification is sequenced in the notification list.

27. The method as recited in claim 26; the method further comprising:
processing a client request by the control engine to form an updated client request in the link server device upon receiving the client request from the mobile device that responds to the received notification from the link server device; and
forwarding the updated client request to the network server.

28. The method as recited in claim 27; wherein said processing a client request by the control engine comprises:
retrieving the uniform resource identifier from the address table with respect to the corresponding address identifier; and
generating the updated client request with the uniform resource identifier therein.

29. A method for an interactive two-way communication mobile device of a wireless network to interact with a network server, the mobile device having a display screen, the method comprising:
establishing a communication session between the mobile device and a link server device over the wireless network through a pair of first and second protocol interfaces, the first protocol interface residing in the mobile device and the second protocol interface residing in the link server device, the link server device coupled to the network server through a landnet, so that the mobile device interacts with the network server via the link server device:
associating an interface engine operating in the mobile device with a control engine operating in the link server device with respect to an account established for the mobile device in the link server device;
receiving a compact data file generated in the link server device over the wireless network, the compact data file having been generated by the link server device by substituting a uniform resource identifier in the message with a corresponding address identifier while maintaining the uniform resource identifier in the link server device; and
rendering the compact data file by the interface engine to display contents of the compact data file.

30. The method as recited in claim 29, wherein said establishing a communication session comprises forwarding device characteristics information of the display screen of the mobile device to the link server device over the wireless network.

31. The method as recited in claim 30, wherein the compact data file is screen description data converted by a message processor in the link server device from a message received from the network server, the message representing a World Wide Web page.

32. The method as recited in claim 31, wherein the World Wide Web page is represented in a markup language.

33. The method as recited in claim 32, wherein the markup language is selected from a group consisting of Handheld Device Markup Language (HDML), HyperText Markup Language (HTML), Wireless Markup Language (WML), Standard Generalized Markup Language (SGML) and Extensible Markup Language (XML).

34. The method as recited in claim 31, wherein the message processor determines whether there are uniform resource identifiers in the message.

35. The method as recited in claim 34, wherein the message processor substitutes the uniform resource identifiers with respective address identifiers if there are uniform resource identifiers in the message; the uniform resource identifiers associated respectively with the address identifiers maintained in an address table in the link server device.

36. The method as recited in claim 35, wherein the screen description data comprises the address identifiers.

37. The method as recited in claim 36, the method further comprising:

navigating in the contents being displayed on the display screen of the mobile device;

generating a client request by a client module in the mobile device; the client request comprising one of the address identifiers; and sending the client request to the link server device over the wireless network.

38. The method as recited in claim 37, wherein said generating a client request comprises:

making a selection in the contents by activating a predefined key on the mobile device.

39. The method as recited in claim 38, wherein the predefined key is in a phone keypad equipped in the mobile device.

40. The method as recited in claim 38, wherein the predefined key is a soft key display in the screen display of the mobile device.

41. The method as recited in claim 37, wherein the control engine in the link server device retrieves one of the uniform resource identifiers from the address table with respect to the one of the address identifiers in the received client request and generates an updated client request with the one of the uniform resource identifiers therein, the updated client request subsequently forwarded to the network server.

42. The method as recited in claim 31, wherein the message processor interprets the message to generate the screen description data according to the device characteristics information.

43. The method as recited in claim 29, wherein the compact data file is an updated notification processed in the link server device from the notification received from the network server, the notification comprising an alert type and a uniform resource identifier.

44. The method as recited in claim 43, wherein the updated notification comprises an address identifier corresponding to the uniform resource identifier in the notification, the uniform resource identifier associated with the address identifier maintained in an address table in the link server device.

45. The method as recited in claim 44, the method further comprising notifying the user of the updated notification according to the alert type when the mobile device receives the updated notification.

46. The method as recited in claim 44, the method further comprising updating an alert list with the received updated notification in the mobile device.

47. The method as recited in claim 46, wherein said updating an alert list comprises:

replacing an entry with the received updated notification if the entry is identical to the received updated notification in the alert list; and inserting the received updated notification into the alert list if there are no any entries identical to the received updated notification in the alert list;

wherein the inserted received updated notification is sequenced in the alert list.

48. The method as recited in claim 29, wherein the compact data file is a service request comprising a special identifier before an address, the address identifying a local service offered in the mobile device.

49. The method as recited in claim 48, the method further comprising:

invoking the local service in the mobile device upon receiving the service request from the link server device;

sending a client request to the link server device over the wireless network in response to the local service; and receiving screen description data generated in the link server device with respect to the client request.

* * * * *